United States Patent
Nakayama et al.

(10) Patent No.: US 11,004,463 B2
(45) Date of Patent: May 11, 2021

(54) SPEECH PROCESSING METHOD, APPARATUS, AND NON-TRANSITORY COMPUTER-READABLE STORAGE MEDIUM FOR STORING A COMPUTER PROGRAM FOR PITCH FREQUENCY DETECTION BASED UPON A LEARNED VALUE

(71) Applicant: FUJITSU LIMITED, Kawasaki (JP)

(72) Inventors: Sayuri Nakayama, Kawasaki (JP);
Taro Togawa, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 16/137,596

(22) Filed: Sep. 21, 2018

(65) Prior Publication Data

US 2019/0096432 A1    Mar. 28, 2019

(30) Foreign Application Priority Data

Sep. 25, 2017  (JP) .................................. 2017-183926

(51) Int. Cl.
  *G10L 25/90*    (2013.01)
  *G10L 25/84*    (2013.01)
  (Continued)

(52) U.S. Cl.
  CPC .............. *G10L 25/90* (2013.01); *G10L 25/18* (2013.01); *G10L 25/63* (2013.01); *G10L 25/78* (2013.01);
  (Continued)

(58) Field of Classification Search
  CPC ......... G10L 25/18; G10L 25/84; G10L 25/90; G10L 2025/906
  (Continued)

(56) References Cited

U.S. PATENT DOCUMENTS

| 7,860,708 B2 * | 12/2010 | Kim ....................... G10L 25/90 704/205 |
| 2001/0029447 A1 * | 10/2001 | Brandel ................. G10L 25/90 704/207 |

(Continued)

FOREIGN PATENT DOCUMENTS

| JP | 2009-086476 | 4/2009 |
| JP | 2011-065041 | 3/2011 |
| WO | 2006/132159 | 12/2006 |

OTHER PUBLICATIONS

Kim, Hae Young, et al. "Pitch detection with average magnitude difference function using adaptive threshold algorithm for estimating shimmer and jitter." Proceedings of the 20th Annual Conference of the IEEE Engineering in Medicine and Biology Society. vol. 6. IEEE, Nov. 1998, pp. 3162-3164. (Year: 1998).*

*Primary Examiner* — Samuel G Neway
(74) *Attorney, Agent, or Firm* — Fujitsu Patent Center

(57) ABSTRACT

A speech processing method for estimating a pitch frequency includes: specifying, for each determination result of a speech-like-frame, a fundamental sound by using a plurality of local maximum values included in a spectrum of a respective frame determined as the speech-like-frame; obtaining a learned value by performing learning processing on a magnitude of the fundamental sound specified from each determination result of the speech-like-frame, the learned value including an average value and a variance of the magnitude of the fundamental sound specified from each determination result of the speech-like-frame; and executing a detection process by using the learned value, the detection process including detecting a pitch frequency of the respective frame determined as the speech-like-frame by using a threshold, the threshold being obtained by subtracting the variance included in the learned value from the average value included in the learned value.

12 Claims, 25 Drawing Sheets

(51) Int. Cl.
*G10L 25/18* (2013.01)
*G10L 25/78* (2013.01)
*G10L 25/63* (2013.01)
*G10L 15/06* (2013.01)

(52) U.S. Cl.
CPC ............ *G10L 25/84* (2013.01); *G10L 15/063* (2013.01); *G10L 2025/906* (2013.01)

(58) Field of Classification Search
USPC .................................................. 704/207, 233
See application file for complete search history.

(56) References Cited

U.S. PATENT DOCUMENTS

| | | | | |
|---|---|---|---|---|
| 2001/0044714 A1* | 11/2001 | Brandel | ............... | G10L 25/90 704/207 |
| 2005/0108004 A1* | 5/2005 | Otani | ............... | G10L 15/1807 704/205 |
| 2009/0210220 A1 | 8/2009 | Mitsuyoshi et al. | | |
| 2011/0276323 A1* | 11/2011 | Seyfetdinov | ............... | G06F 21/32 704/207 |
| 2012/0010881 A1* | 1/2012 | Avendano | ............... | G10L 21/008 704/226 |
| 2012/0089396 A1* | 4/2012 | Patel | ............... | G10L 25/00 704/249 |
| 2014/0006019 A1* | 1/2014 | Paajanen | ............... | G10L 21/0208 704/233 |
| 2014/0142931 A1* | 5/2014 | Qi | ............... | G10L 25/90 704/207 |
| 2014/0205119 A1* | 7/2014 | James | ............... | G10L 21/00 381/316 |
| 2015/0032447 A1* | 1/2015 | Gunawan | ............... | G10L 25/84 704/233 |
| 2015/0058002 A1* | 2/2015 | Yermeche | ............... | G10L 25/84 704/233 |
| 2015/0262587 A1* | 9/2015 | Chen | ............... | G10L 25/90 704/203 |
| 2016/0140975 A1* | 5/2016 | Kamamoto | ............... | G10L 19/06 704/203 |
| 2016/0261959 A1* | 9/2016 | Harczos | ............... | G10L 21/013 |
| 2016/0284364 A1* | 9/2016 | Maouche | ............... | G10L 25/84 |
| 2016/0343387 A1* | 11/2016 | Kamamoto | ............... | G10L 25/90 |
| 2017/0047083 A1* | 2/2017 | Okuyama | ............... | G10G 7/02 |
| 2017/0287507 A1* | 10/2017 | Khanagha | ............... | G10L 25/90 |
| 2019/0088272 A1* | 3/2019 | Shioda | ............... | G10L 25/84 |
| 2019/0096432 A1* | 3/2019 | Nakayama | ............... | G10L 25/90 |

* cited by examiner

| | COMPARISION RESULT WITH LEARNING VALUE | ESTIMATED VALUE | |
|---|---|---|---|
| NOISE |  | NONE | NO ERRONEOUS DETECTION |
| SMALL HARMONIC SOUND |  | f [Hz] | MAY DETECT |

US 11,004,463 B2

SPEECH PROCESSING METHOD, APPARATUS, AND NON-TRANSITORY COMPUTER-READABLE STORAGE MEDIUM FOR STORING A COMPUTER PROGRAM FOR PITCH FREQUENCY DETECTION BASED UPON A LEARNED VALUE

CROSS-REFERENCE TO RELATED APPLICATION

This application is based upon and claims the benefit of priority of the prior Japanese Patent Application No. 2017-183926, filed on Sep. 25, 2017, the entire contents of which are incorporated herein by reference.

FIELD

The embodiments discussed herein are related to a speech processing method, a speech processing apparatus, and a non-transitory computer-readable storage medium for storing a speech processing computer program.

BACKGROUND

In recent years, in many companies, in order to estimate customer satisfaction and the like and proceed with marketing advantageously, there is a demand to acquire information on emotions and the like of a customer (or a respondent) from a conversation between the respondent and the customer. Human emotions often appear in speeches, for example, the height of the speech (pitch frequency) is one of the important factors in capturing human emotions.

Here, terms related to an input spectrum of a speech will be described. FIG. 20 is a diagram for describing terms related to the input spectrum. As illustrated in FIG. 20, generally, an input spectrum 4 of a human speech illustrates local maximum values at equal intervals. The horizontal axis of the input spectrum 4 is the axis corresponding to the frequency, and the vertical axis is the axis corresponding to the magnitude of the input spectrum 4.

The sound of the lowest frequency component is set as "fundamental sound". The frequency of the fundamental sound is set as a pitch frequency. In the example illustrated in FIG. 20, the pitch frequency is f. The sound of each frequency component (2 f, 3 f, and 4 f) corresponding to an integral multiple of the pitch frequency is set as a harmonic sound. The input spectrum 4 includes a fundamental sound 4a, harmonic sounds 4b, 4c, and 4d.

Next, an example of Related Art 1 for estimating a pitch frequency will be described. FIG. 21 is a diagram (1) for describing Related Art 1. As illustrated in FIG. 21, this related art includes a frequency conversion unit 10, a correlation calculation unit 11, and a search unit 12.

The frequency conversion unit 10 is a processing unit that calculates the frequency spectrum of the input speech by Fourier transformation of the input speech. The frequency conversion unit 10 outputs the frequency spectrum of the input speech to the correlation calculation unit 11. In the following description, the frequency spectrum of the input speech is referred to as input spectrum.

The correlation calculation unit 11 is a processing unit that calculates a correlation value between cosine waves of various frequencies and an input spectrum for each frequency. The correlation calculation unit 11 outputs information correlating the frequency of the cosine wave and the correlation value to the search unit 12.

The search unit 12 is a processing unit that outputs the frequency of a cosine wave associated with the maximum correlation value among a plurality of correlation values as a pitch frequency.

FIG. 22 is a diagram (2) for describing Related Art 1. In FIG. 22, the input spectrum 5a is the input spectrum output from the frequency conversion unit 10. The horizontal axis of the input spectrum 5a is the axis corresponding to the frequency, and the vertical axis is the axis corresponding to the magnitude of the spectrum.

Cosine waves 6a and 6b are part of the cosine wave received by the correlation calculation unit 11. The cosine wave 6a is a cosine wave having a frequency f [Hz] on the frequency axis and a peak at a multiple thereof. The cosine wave 6b is a cosine wave having a frequency 2 f [Hz] on the frequency axis and a peak at a multiple thereof.

The correlation calculation unit 11 calculates a correlation value "0.95" between an input spectrum 5a and the cosine wave 6a. The correlation calculation unit 11 calculates a correlation value "0.40" between the input spectrum 5a and the cosine wave 6b.

The search unit 12 compares each correlation value and searches for a correlation value that is the maximum value. In the example illustrated in FIG. 22, since the correlation value "0.95" is the maximum value, the search unit 12 outputs the frequency f [Hz] corresponding to the correlation value "0.95" as a pitch frequency. In a case where the maximum value is less than a predetermined threshold value, the search unit 12 determines that there is no pitch frequency.

Here, Related Art 1 has the following problem. FIG. 23 is a diagram for describing a problem of Related Art 1. For example, in a case where the harmonic sound component is small, the correlation value becomes small and it is difficult to detect a pitch frequency. In FIG. 23, the horizontal axis of an input spectrum 5b is the axis corresponding to the frequency, and the vertical axis is the axis corresponding to the magnitude of the spectrum. In the input spectrum 5b, a harmonic sound 3b is small.

For example, the correlation calculation unit 11 calculates a correlation value "0.20" between the input spectrum 5b and the cosine wave 6a. The correlation calculation unit 11 calculates a correlation value "0.01" between the input spectrum 5b and the cosine wave 6b.

The search unit 12 compares each correlation value and searches for a correlation value that is the maximum value. In addition, the threshold value is set to "0.3". Then, since the maximum value "0.20" is less than the threshold value, the search unit 12 determines that there is no pitch frequency.

Related Art 2 is available as a method for avoiding the problem of the above-described Related Art 1. FIG. 24 is a diagram (2) for describing Related Art 2. In Related Art 2, a frequency corresponding to the largest local maximum value among a plurality of local maximum values is detected as a pitch frequency. For example, in the example illustrated in FIG. 24, since the value corresponding to the frequency "f" of the input spectrum 5b has the largest local maximum value, the pitch frequency is set to "f".

Examples of the related art include Japanese Laid-open Patent Publication No. 2011-065041, Japanese Laid-open Patent Publication No. 2009-086476, and International Publication Pamphlet No. WO 2006/132159.

SUMMARY

According to an aspect of the invention, a speech processing method for estimating a pitch frequency includes:

executing a conversion process that includes calculating a spectrum from a plurality of frames included in an input signal; executing a determination process that includes determining a speech-like frame from the plurality of frames based on characteristics of the spectrum of the frame; executing a learning process that includes specifying a fundamental sound based on a plurality of local maximum values included in the spectrum of the speech frame and learning a learning value based on a magnitude of the fundamental sound; and executing a detection process of detecting a pitch frequency of the frame based on the spectrum of the frame and the learning value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

There is a problem that the estimation precision of the pitch frequency may not be improved with the above-described related art.

Figure 25:
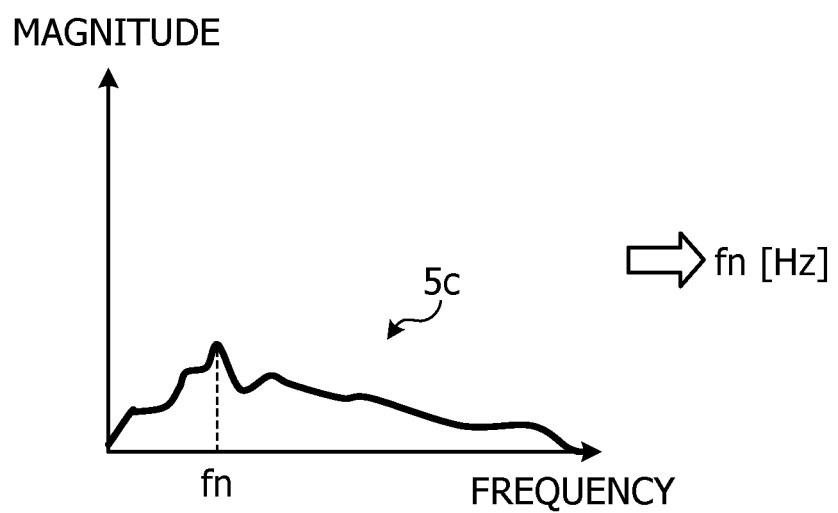
FIG. 25 is a diagram for describing a problem of Related Art 2.

FIG. 25 is a diagram for describing a problem of Related Art 2. An input spectrum 5c of FIG. 25 illustrates the spectrum of a noise section. The horizontal axis of the input spectrum 5c is the axis corresponding to the frequency, and the vertical axis is the axis corresponding to the magnitude of the spectrum. If Related Art 2 is used, even if there is the input spectrum 5c of the noise section, a pitch frequency is erroneously detected by comparison of the local maximum values. In the example illustrated in FIG. 25, since the value corresponding to a frequency "fn" is the largest among the local maximum values, the pitch frequency "fn" is erroneously detected.

According to one aspect of the present disclosure, a technique for improving the accuracy of pitch frequency estimation in speech processing is provided.

Examples of a speech processing program, a speech processing method and a speech processing apparatus disclosed in the present application will be described in detail below with reference to drawings. The present disclosure is not limited by this example.

EXAMPLE 1

Figure 1:
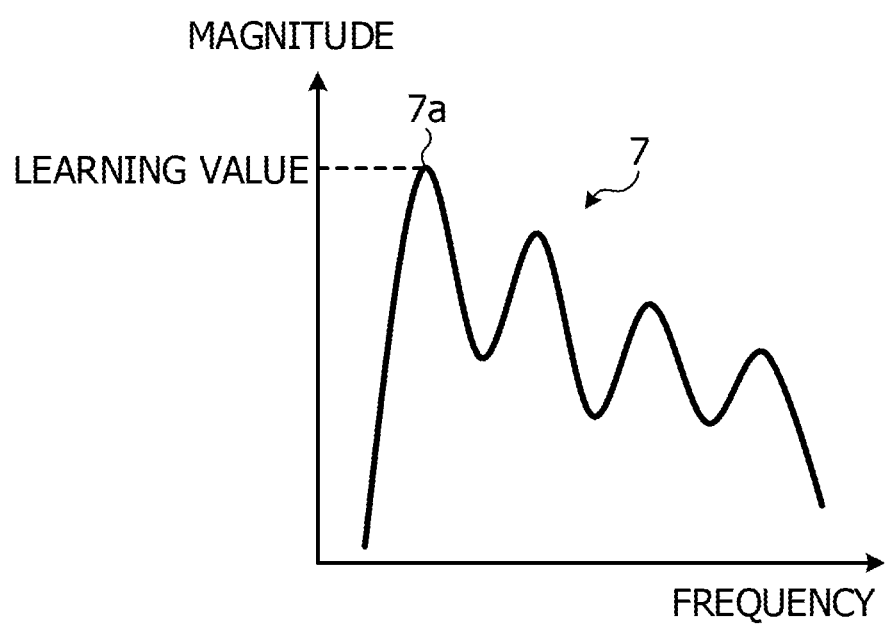
FIG. 1 is a diagram (1) for describing processing of a speech processing apparatus according to Example 1.
Figure 2:
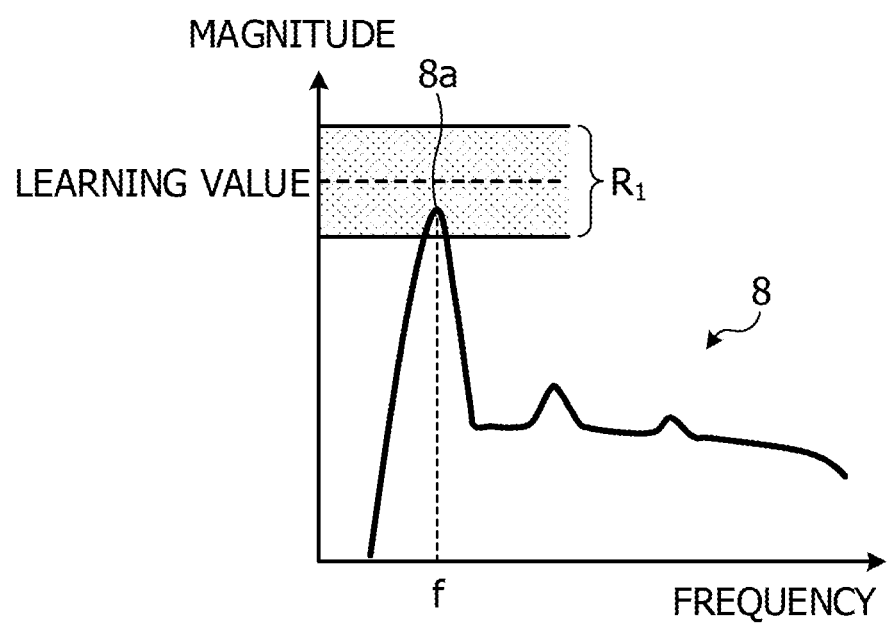
FIG. 2 is a diagram (2) for describing the processing of the speech processing apparatus according to Example 1.

FIGS. 1 and 2 are diagrams for describing the processing of the speech processing apparatus according to Example 1. The speech processing apparatus calculates a spectrum from a plurality of frames included in an input signal and specifies a speech-like frame based on the characteristics of the spectrum. In the following description, a frame that is likely to be a speech is expressed as "speech frame" as appropriate.

A spectrum 7 in FIG. 1 is a spectrum corresponding to a speech frame determined to be speech-like. The horizontal axis of the spectrum 7 is the axis corresponding to the frequency, and the vertical axis is the axis corresponding to the magnitude of the spectrum 7. The speech processing apparatus learns the magnitude of a fundamental sound 7a of the spectrum 7 as a learning value. For example, the speech processing apparatus updates the learning value based on a plurality of past speech frames.

A spectrum 8 in FIG. 2 is a spectrum of a frame to be detected for a pitch frequency. The horizontal axis of the spectrum 8 is the axis corresponding to the frequency, and the vertical axis is the axis corresponding to the magnitude of the spectrum 8. The speech processing apparatus compares the magnitude of a fundamental sound 8a of the spectrum 8 with the learning value to determine whether or not the magnitude of the fundamental sound 8a is included in a predetermined range R1 with reference to the learning value.

In a case where the magnitude of the fundamental sound 8a is included in the predetermined range R1, the speech processing apparatus outputs the frequency "f [Hz]" corresponding to the fundamental sound 8a as an estimated value of the pitch frequency. As a result, it is possible to improve the accuracy of the pitch frequency estimation.

Figure 3:
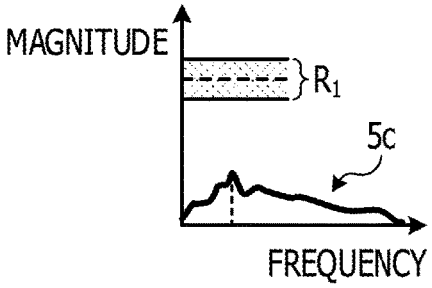
FIG. 3 is a diagram for describing an example of the effect of the speech processing apparatus according to Example 1.
Figure 3:
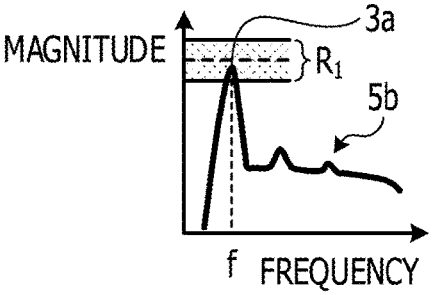

FIG. 3 is a diagram for describing an example of the effect of the speech processing apparatus according to Example 1. The spectrum 5c illustrated in FIG. 3 corresponds to the spectrum 5c of the noise section described in FIG. 25. When comparing the spectrum 5c with the predetermined range R1 based on the learning value, since the portion included in the predetermined range R1 does not exist in the spectrum 5c, the speech processing apparatus determines that an estimated value of the pitch frequency is "none". As a result, as described with reference to FIG. 25, it is possible to suppress erroneous detection of the pit frequency from the input spectrum 5c of the noise section.

Figure 23:
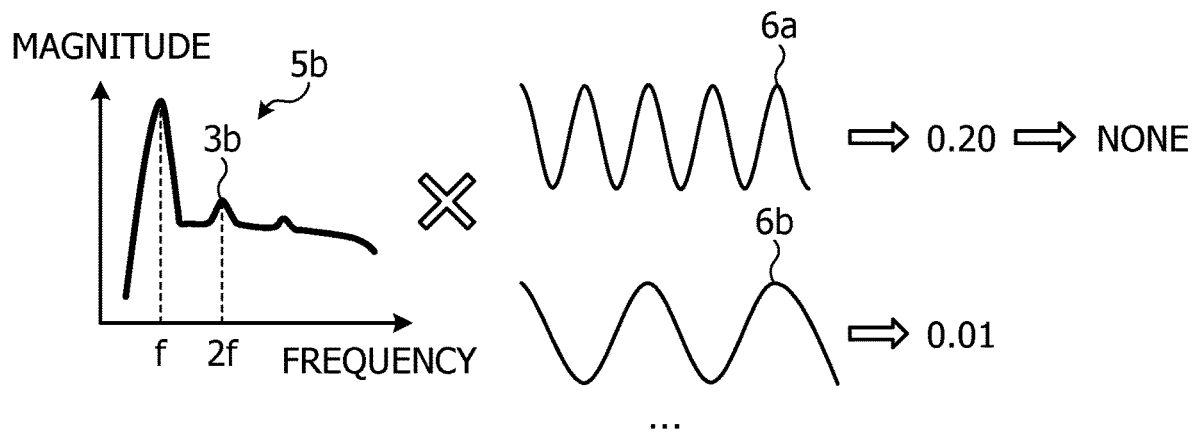
FIG. 23 is a diagram for describing a problem of Related Art 1.
Figure 24:
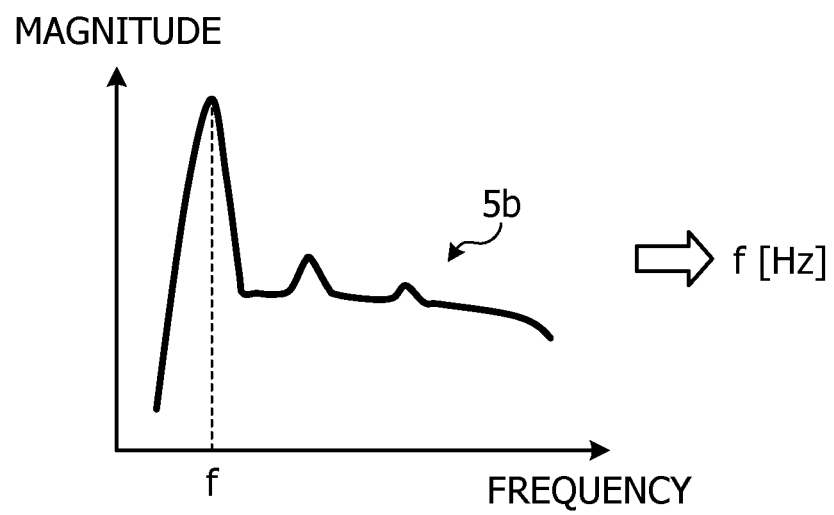
FIG. 24 is a diagram (2) for describing Related Art 2.

The spectrum 5b illustrated in FIG. 3 corresponds to the spectrum 5b having a small harmonic sound component described with reference to FIG. 23. When comparing the spectrum 5b with the predetermined range R1 based on the learning value, since a fundamental sound 3a is included in the predetermined range R1, the speech processing apparatus sets the frequency "f [Hz]" corresponding to the fundamental sound 3a as an estimated value of the pitch frequency. As a result, as described with reference to FIG. 23, it is possible to solve the problem that a pitch frequency is not detected due to the small harmonic sound component.

Figure 4:
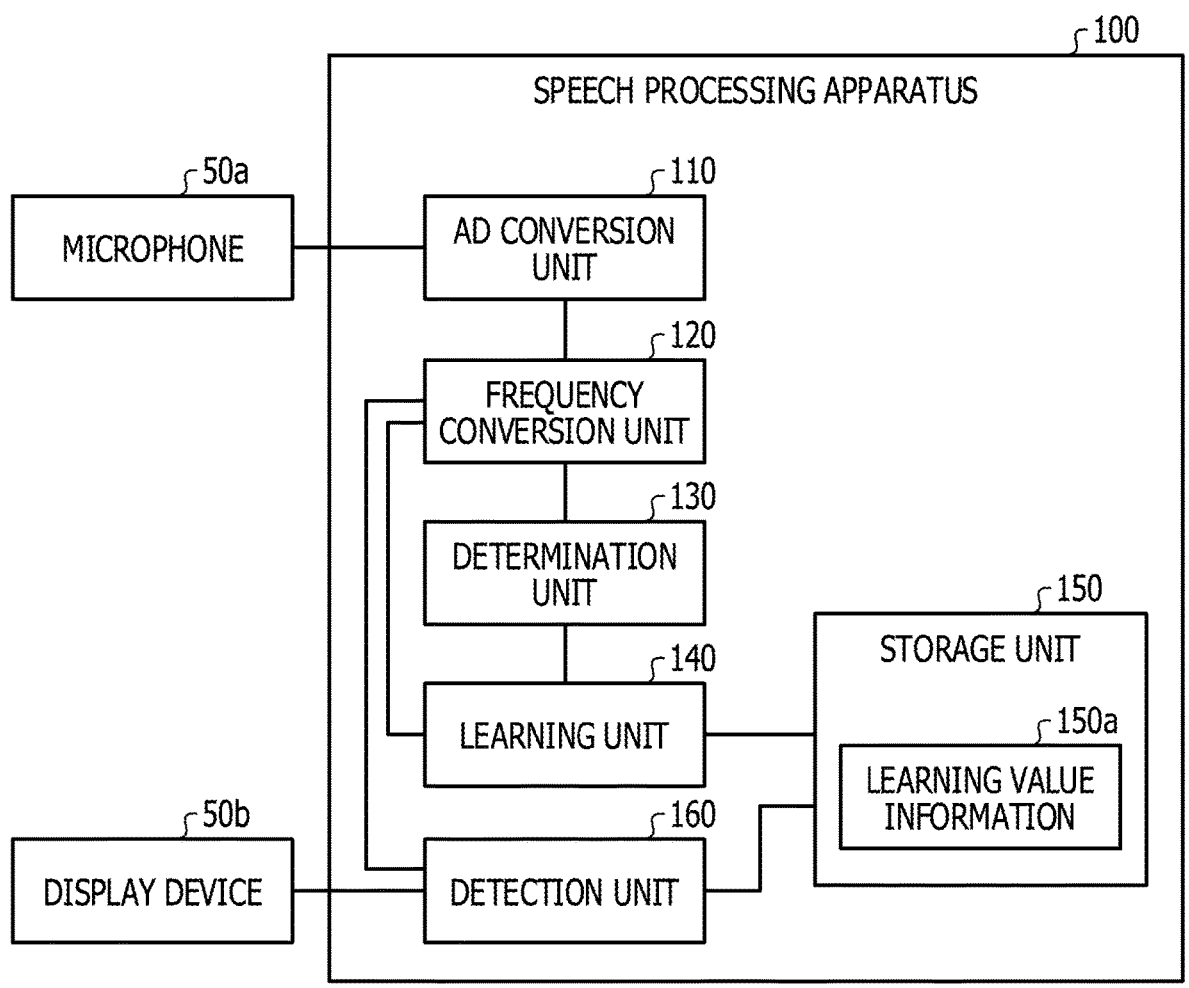
FIG. 4 is a functional block diagram illustrating a configuration of the speech processing apparatus according to Example 1.

Next, an example of a configuration of the speech processing apparatus according to Example 1 will be described. FIG. 4 is a functional block diagram illustrating the configuration of the speech processing apparatus according to Example 1. As illustrated in FIG. 4, a speech processing apparatus 100 is connected to a microphone 50a and a display device 50b.

The microphone 50a outputs a signal of a speech (or other than speech) collected from a speaker to the speech processing apparatus 100. In the following description, the signal collected by the microphone 50a is referred to as "input signal". For example, the input signal collected while the speaker is uttering includes a speech. The input signal collected while the speaker is not uttering includes background noise and the like.

Figure 5:
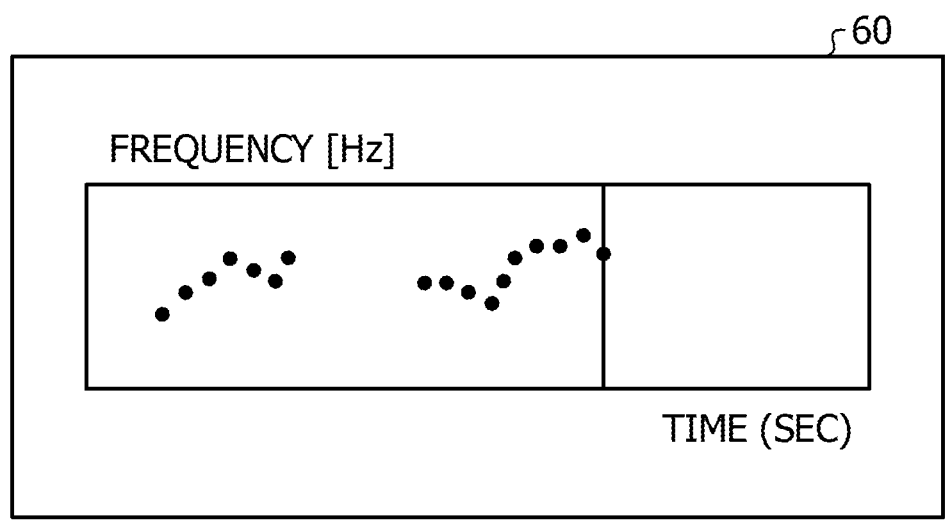
FIG. 5 is a diagram illustrating an example of a display screen.

The display device 50b is a display device that displays information on the pitch frequency detected by the speech processing apparatus 100. The display device 50b corresponds to a liquid crystal display, a touch panel, or the like. FIG. 5 is a diagram illustrating an example of a display screen. For example, the display device 50b displays a display screen 60 illustrating the relationship between time and pitch frequency. In FIG. 5, the horizontal axis is the axis corresponding to time, and the vertical axis is the axis corresponding to the pitch frequency.

The following returns to the description of FIG. 4. The speech processing apparatus 100 includes an AD conversion unit 110, a frequency conversion unit 120, a determination unit 130, a learning unit 140, a storage unit 150, and a detection unit 160.

The AD conversion unit 110 is a processing unit that receives an input signal from the microphone 50a and executes analog-to-digital (AD) conversion. Specifically, the AD conversion unit 110 converts an input signal (analog signal) into an input signal (digital signal). The AD conversion unit 110 outputs the input signal (digital signal) to the frequency conversion unit 120. In the following description, an input signal (digital signal) output from the AD conversion unit 110 is simply referred to as input signal.

The frequency conversion unit 120 divides an input signal x(n) into a plurality of frames of a predetermined length and performs fast Fourier transform (FFT) on each frame to calculate a spectrum X(f) of each frame. Here, "x(n)" indicates an input signal of sample number n. "X(f)" indicates a spectrum of the frequency f.

The frequency conversion unit 120 calculates a power spectrum P(l, k) of the frame based on Equation (1). In Equation (1), a variable "l" indicates a frame number, and a variable "k" indicates a frequency number. In the following description, the power spectrum is expressed as an "input spectrum". The frequency conversion unit 120 outputs the information of the input spectrum to the determination unit 130, the learning unit 140, and the detection unit 160.

$$P(l, k) = 10 \log_{10}|X(k)|^2 \qquad (1)$$

The determination unit 130 is a processing unit that determines a speech-like frame from a plurality of frames based on the characteristics of the input spectrum of the frames. In the following, a frame that is likely to be a speech is expressed as a "speech frame". The determination unit 130 outputs the determination result to the learning unit 140. The determination unit 130 sequentially performs processing of calculating a spectrum envelope, processing of calculating a difference sum between an input spectrum and a spectrum envelope, and processing of determining speech likeness.

The processing for the determination unit 130 to calculate a spectrum envelope will be described. The determination unit 130 multiplies the input spectrum P(l, k) by an analysis window such as the Hanning window or the like to acquire a spectrum envelope P'(l, k) obtained by smoothing the input spectrum P(l, k). A Hanning window W(m) is represented by Equation (2). A variable "m" illustrated in Equation (2) indicates "bin" of the Hanning window. Q indicates a filter length of the Hanning window. For example, if Q=33, values from 1 to 33 are input to m.

$$W(m) = 0.5 - 0.5\cos\left(\frac{m\pi}{\left\lceil\frac{Q}{2}\right\rceil + 1}\right) \qquad (2)$$

Figure 6:
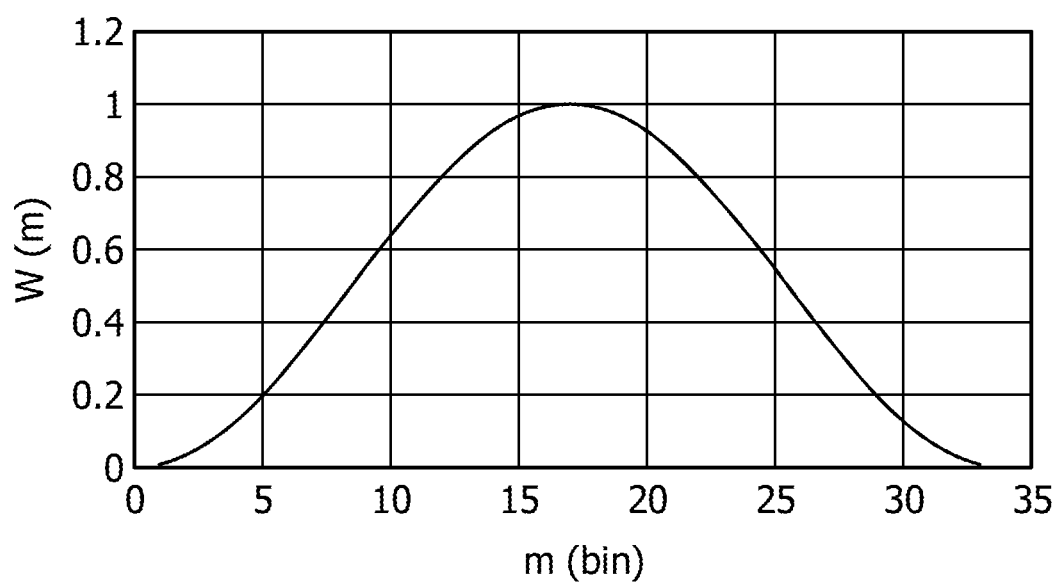
FIG. 6 is a diagram illustrating an example of Hanning window.

FIG. 6 is a diagram illustrating an example of Hanning window. In FIG. 6, the filter length Q is 33, which is the Hanning window. In FIG. 6, the horizontal axis is the axis corresponding to m(bin), and the vertical axis is the axis corresponding to the value of the Hanning window W(m).

The determination unit 130 calculates the spectrum envelope P'(l, k) based on Equation (3).

$$P'(l, k) = \sum_{i=1}^{Q} P\left(l, k - \left\lceil\frac{Q}{2}\right\rceil + i\right)W(i) \qquad (3)$$

A process in which the determination unit 130 calculates a difference sum between the input spectrum and the spectrum envelope will be described. The determination unit 130 calculates a difference sum S(l) between the input spectrum and the spectrum envelope based on Equation (4). In Equation (4), ML indicates a lower limit of the calculation band of the difference sum. MH indicates an upper limit of the calculation band of the difference sum. As illustrated in Equation (4), in a case where the difference between the input spectrum P(l, k) and the spectrum envelope P'(l, k) is a negative value, the determination unit 130 adds 0.

$$S(l) = \sum_{k=ML}^{MH} \max(P(l, k) - P'(l, k), 0) \quad (4)$$

Processing for determining the speech likeness by the determination unit 130 will be described. For example, the determination unit 130 determines whether or not the frame of a frame number "l" is a speech frame based on Equation (5).

$$L(l) = \begin{cases} 1 & S(l) \geq TH1 \\ 0 & S(l) < TH1 \end{cases} \quad (5)$$

In a case where a difference sum S(l) is equal to or larger than a threshold value TH1, the determination unit 130 determines that the frame of the frame number "l" is a speech frame and sets "1" to a determination result L(l). On the other hand, in a case where the difference sum S(l) is less than the threshold value TH1, the determination unit 130 determines that the frame of the frame number "l" is not a speech frame and sets "0" to the determination result L(l). The determination unit 130 outputs the information of the determination result L(l) to the learning unit 140.

The learning unit 140 is a processing unit that specifies a part of a plurality of local maximum values included in a speech frame as a fundamental sound and learns a learning value based on the magnitude of the fundamental sound. The learning unit 140 registers information of the learned learning value in learning value information 150a. The learning unit 140 acquires the determination result L(l) from the determination unit 130, and in a case where the value of the acquired determination result L(l) is "1", the learning unit 140 sets the frame of the frame number "l" as a speech frame.

The learning unit 140 acquires the input spectrum of the speech frame from the frequency conversion unit 120. The learning unit 140 searches for a local maximum value LMj (j=1, 2, . . . ) of the input spectrum of the speech frame and a maximum value M. For example, the learning unit 140 calculates the gradient of the input spectrum and sets P(l, k) at the frequency at which the gradient changes from minus to plus as the local maximum value LMj. The learning unit 140 sets P(l, k) at the frequency having the maximum value among the local maximum values LMj as the maximum value M.

The learning unit 140 specifies a fundamental sound B(l) of the input spectrum of the speech frame based on the local maximum value LMj and the maximum value M. The learning unit 140 specifies the local maximum value LMj that is larger than the "maximum value M-threshold value TH2" among the local maximum values LMj and sets the local maximum value LMj having the lowest corresponding frequency among the specified local maximum values as the fundamental sound B(l).

Figure 7:
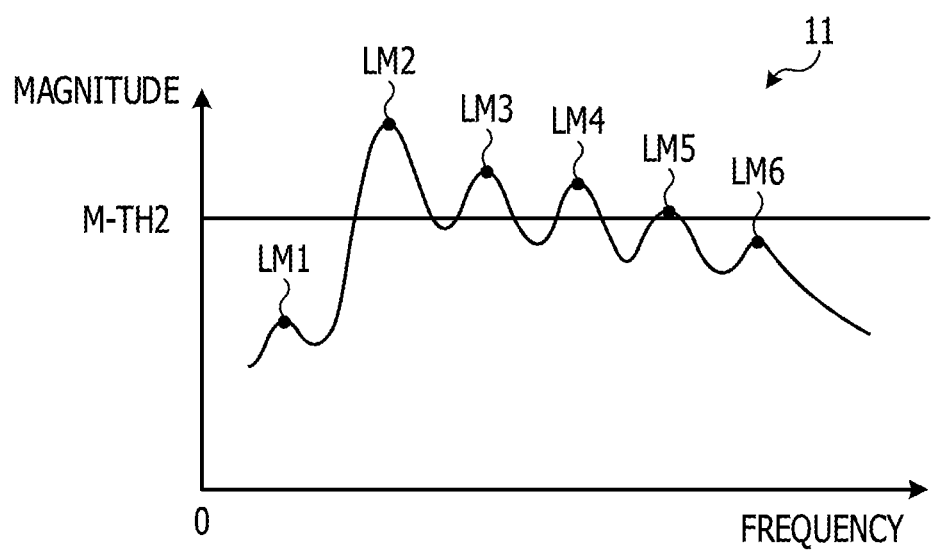
FIG. 7 is a diagram for describing processing of a learning unit according to Example 1.

FIG. 7 is a diagram for describing the processing of the learning unit according to Example 1. In FIG. 7, the horizontal axis is the axis corresponding to the frequency, and the vertical axis is the axis corresponding to the magnitude of the input spectrum. In the example illustrated in FIG. 7, the learning unit 140 specifies local maximum values LM1, LM2, LM3, LM4, LM5, and LM6 as local maximum values from an input spectrum 11 of the speech frame. In addition, the maximum value M is the "local maximum value LM2". In addition, the local maximum values LMj larger than the "maximum value M-threshold value TH2" are LM2, LM3, LM4, and LM5. The learning unit 140 specifies "LM2" having the lowest frequency among LM2, LM3, LM4, and LM5 as a fundamental sound.

When the determination result L(l)=1, the learning unit 140 calculates an average value $B_1(l)$ and a variance $B_2(l)^2$ as learning values of the fundamental sound B(l). For example, the learning unit 140 calculates the average value $B_1(l)$ based on Equation (6). The learning unit 140 calculates the variance $B_2(l)^2$ based on Equation (7). The learning unit 140 registers information of the calculated average value $B_1(l)$ and variance $B_2(l)^2$ in the learning value information 150a.

$$B_1(l) = (1 - \alpha) * B_1(l - 1) + \alpha * B_1(l) \quad (6)$$

$$B_2(l)^2 = \frac{1}{L} \sum_{i=0}^{L-1} (B_1(i) - B_1(l))^2 \quad (7)$$

The storage unit 150 includes learning value information 150a. The storage unit 150 corresponds to a semiconductor memory device such as a random-access memory (RAM), a read-only memory (ROM), a flash memory, or a storage device such as a hard disk drive (HDD).

The learning value information 150a corresponds to the information of the average value $B_1(l)$ and variance $B_2(l)^2$ calculated by the learning unit 140.

The detection unit 160 is a processing unit that detects a pitch frequency based on the learning value information 150a and the maximum value of the input spectrum. For example, the detection unit 160 specifies a value having the maximum value among the local maximum values included in the input spectrum as the maximum value M. In addition, the detection unit 160 sets the frequency corresponding to the maximum value M to "F".

The detection unit 160 detects a pitch frequency (F0) based on Equation (8). For example, in a case where the maximum value M is larger than "$B_1(l)$-$B_2(l)$", the detection unit 160 sets the pitch frequency to "F". On the other hand, in a case where the maximum value M is equal to or less than "$B_1(l)$-$B_2(l)$", the detection unit 160 sets the pitch frequency to "0" (a value indicating that there is no pitch frequency).

$$F0 = \begin{cases} F & \text{when } M > B1(l) - B2(l) \\ 0 & \text{other than that} \end{cases} \quad (8)$$

The detection unit 160 detects a pitch frequency for each frame by repeatedly executing the above processing. The detection unit 160 may generate information on a display screen in which time and a pitch frequency are associated with each other and cause the display device 50b to display the information. For example, the detection unit 160 estimates the time from the frame number "l".

Figure 8:
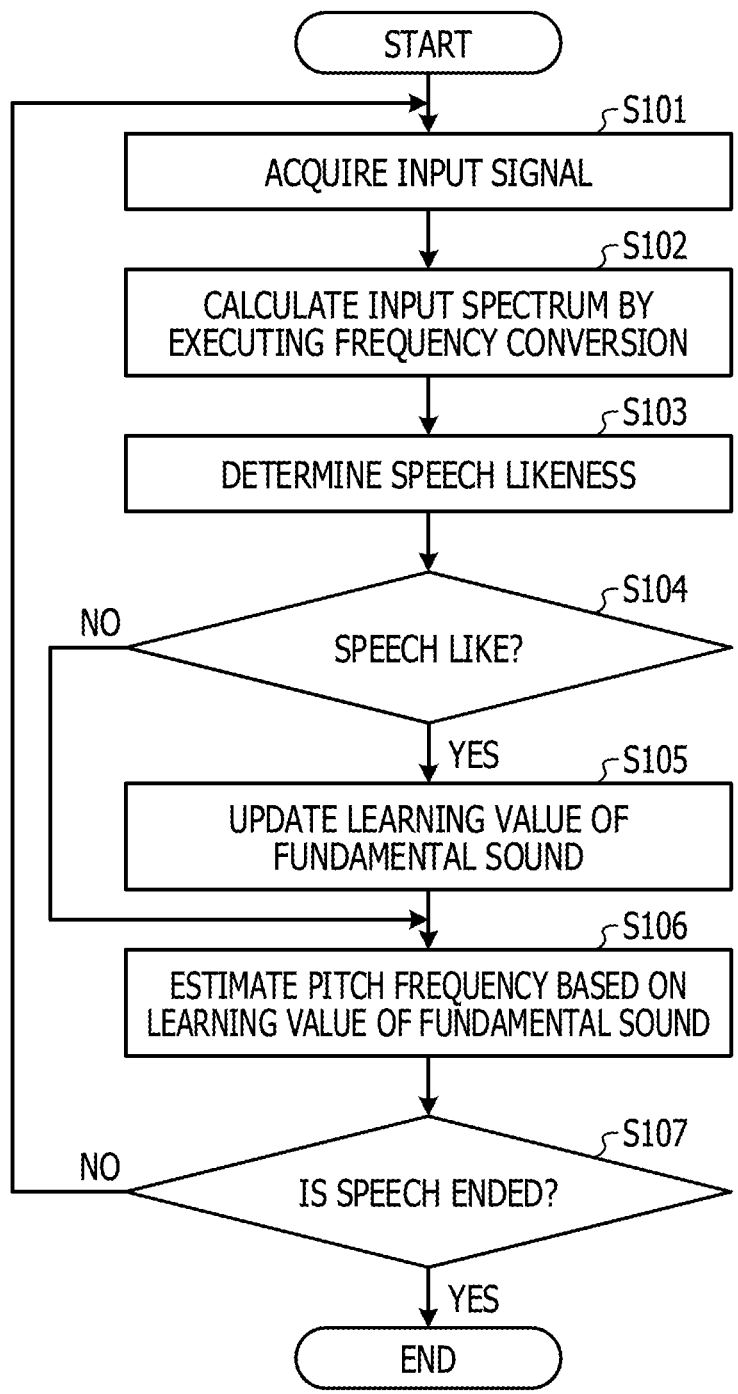
FIG. 8 is a flowchart illustrating a processing procedure of the speech processing apparatus according to Example 1.

Next, an example of the processing procedure of the speech processing apparatus 100 according to Example 1 will be described. FIG. 8 is a flowchart illustrating a processing procedure of the speech processing apparatus according to Example 1. As illustrated in FIG. 8, the speech processing apparatus 100 acquires an input signal from the microphone 50a (step S101).

The frequency conversion unit 120 of the speech processing apparatus 100 calculates an input spectrum by executing frequency conversion on a frame of an input signal (step S102). The determination unit 130 of the speech processing apparatus 100 determines speech likeness (step S103). In a case where the speech processing apparatus 100 determines that the frame is a speech-like frame (step S104, Yes), the processing proceeds to step S105. On the other hand, in a case where the speech processing apparatus 100 does not determine that the frame is not a speech-like frame (step S104, No), the processing proceeds to step S106.

The learning unit 140 of the speech processing apparatus 100 updates the learning value of the fundamental sound based on the frame determined to be speech-like (step S105). The detection unit 160 of the speech processing apparatus 100 estimates a pitch frequency based on the learning value of the fundamental sound (step S106).

In a case where the speech is not ended (step S107, No), the speech processing apparatus 100 proceeds to step S101. On the other hand, in a case where the speech is ended (step S107, Yes), the speech processing apparatus 100 ends the processing.

Next, the effect of the speech processing apparatus 100 according to Example 1 will be described. The speech processing apparatus 100 determines the speech likeness of each frame included in the input signal and learns the magnitude of the fundamental sound of the speech frame determined to be speech-like as a learning value. Then, the speech processing apparatus 100 detects a pitch frequency based on the magnitude of the fundamental sound of the input spectrum detected from the frame to be detected for a pitch frequency and the learning value. As a result, it is possible to improve the accuracy of the pitch frequency estimation.

The speech processing apparatus 100 is configured to calculate a spectrum envelope by smoothing the input spectrum of the frame in a frequency direction and determines whether or not the frame is a speech frame based on a difference sum between the input spectrum and the spectrum envelope. In this way, it is possible to accurately detect a speech-like frame by using the difference sum between the input spectrum and the spectrum envelope.

The speech processing apparatus 100 learns a learning value based on an average value or variance of the local maximum values of the input spectra of a plurality of speech frames. In this way, by using the average value and variance of the local maximum values as learning values, it is possible to give a range to the magnitude of the fundamental sound to be detected, thereby suppressing the omission of detection of a pitch frequency.

The speech processing apparatus 100 searches for the largest local maximum value out of a plurality of local maximum values included in a predetermined band of the input spectrum of the speech frame. In addition, the speech processing apparatus 100 learns a learning value based on the local maximum value of which magnitude compared with the largest local maximum value is included within a certain range and is on the lowest frequency side among the plurality of local maximum values. As a result, it is possible to appropriately detect a fundamental sound included in the speech frame. For example, in FIG. 7, it is possible to suppress the maximum value LM1 and the like from being detected as a fundamental sound and to detect the local maximum value LM2 as a fundamental sound.

EXAMPLE 2

Figure 9:
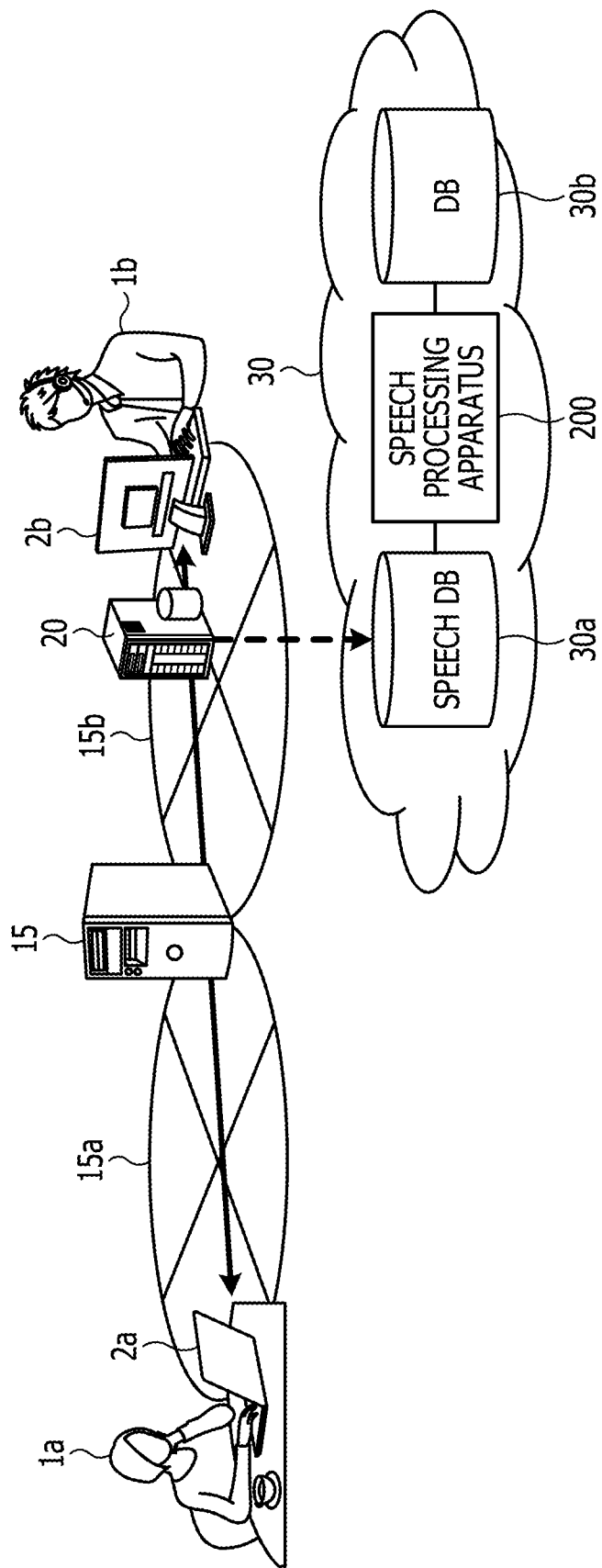
FIG. 9 is a diagram illustrating an example of a speech processing system according to Example 2.

FIG. 9 is a diagram illustrating an example of a speech processing system according to Example 2. As illustrated in FIG. 9, the speech processing system includes terminal devices 2a and 2b, a gateway (GW) 15, a recording device 20, and a cloud network 30. The terminal device 2a is connected to the GW 15 via a telephone network 15a. The recording device 20 is connected to the GW 15, the terminal device 2b, and the cloud network 30 via an individual network 15b.

The cloud network 30 includes a speech database (DB) 30a, a DB 30b, and a speech processing apparatus 200. The speech processing apparatus 200 is connected to the speech DB 30a and the DB 30b. The processing of the speech processing apparatus 200 may be executed by a plurality of servers (not illustrated) on the cloud network 30.

The terminal device 2a transmits a signal of the speech (or other than speech) of the speaker 1a collected by a microphone (not illustrated) to the recording device 20 via the GW 15. In the following description, a signal transmitted from the terminal device 2a is referred to as a first signal.

The terminal device 2b transmits a signal of the speech (or other than speech) of the speaker 1b collected by a microphone (not illustrated) to the recording device 20. In the following description, a signal transmitted from the terminal device 2b is referred to as a second signal.

The recording device 20 records the first signal received from the terminal device 2a and registers the information of the recorded first signal in the speech DB 30a. The recording device 20 records the second signal received from the terminal device 2b and registers information of the recorded second signal in the speech DB 30a.

The speech DB 30a includes a first buffer (not illustrated) and a second buffer (not illustrated). For example, the speech DB 30a corresponds to a semiconductor memory element such as a RAM, a ROM, a flash memory, or a storage device such as an HDD.

The first buffer is a buffer that holds the information of the first signal. The second buffer is a buffer that holds the information of the second signal.

The DB 30b stores an estimation result of the pitch frequency by the speech processing apparatus 200. For example, the DB 30b corresponds to a semiconductor memory element such as a RAM, a ROM, a flash memory, or a storage device such as an HDD.

The speech processing apparatus 200 acquires the first signal from the speech DB 30a, estimates a pitch frequency of the utterance of the speaker 1a, and registers the estimation result in the DB 30b. The speech processing apparatus 200 acquires the second signal from the speech DB 30a, estimates a pitch frequency of the utterance of the speaker 1b, and registers the estimation result in the DB 30b. In the following description of the speech processing apparatus 200, the processing in which the speech processing apparatus 200 acquires the first signal from the speech DB 30a and estimates the pitch frequency of the utterance of the speaker 1a will be described. The processing of acquiring the second signal from the speech DB 30a and estimating the pitch frequency of the utterance of the speaker 1b by the speech processing apparatus 200 corresponds to the processing of acquiring the first signal from the speech DB 30a and estimating the pitch frequency of the utterance of the speaker 1a, and thus the description thereof will be omitted. In the following description, the first signal is referred to as "input signal".

Figure 10:
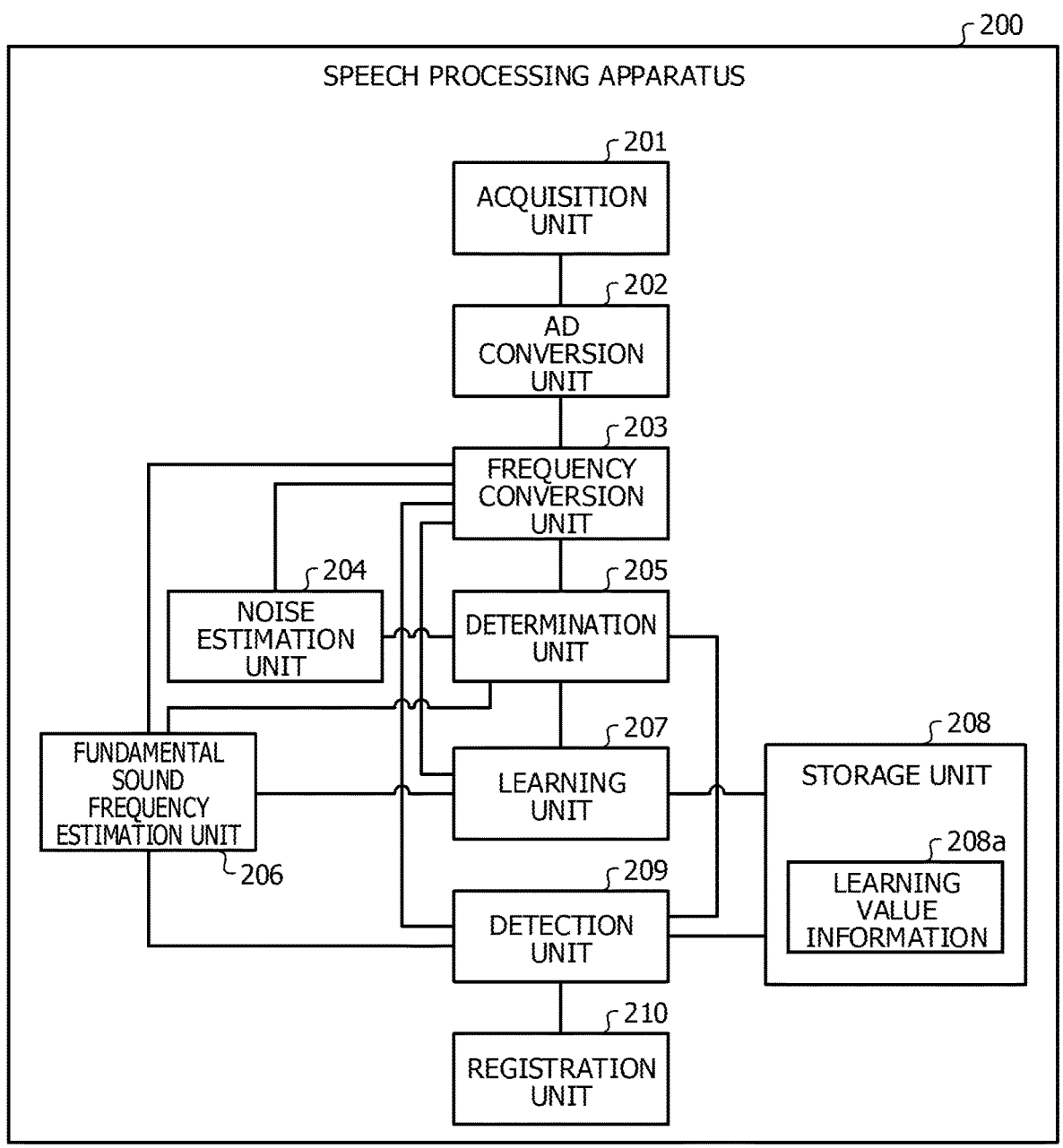
FIG. 10 is a functional block diagram illustrating a configuration of a speech processing apparatus according to Example 2.

FIG. 10 is a functional block diagram illustrating the configuration of the speech processing apparatus according to Example 2. As illustrated in FIG. 10, the speech processing apparatus 200 includes an acquisition unit 201, an AD conversion unit 202, a frequency conversion unit 203, a noise estimation unit 204, a determination unit 205, and a fundamental sound frequency estimation unit 206. In addition, the speech processing apparatus 200 includes a learning unit 207, a storage unit 208, a detection unit 209, and a registration unit 210.

The acquisition unit 201 is a processing unit that acquires an input signal from the speech DB 30a. The acquisition unit 201 outputs the acquired input signal to the AD conversion unit 202.

The AD conversion unit 202 is a processing unit that acquires an input signal from the acquisition unit 201 and executes AD conversion on the acquired input signal. Specifically, the AD conversion unit 202 converts an input signal (analog signal) into an input signal (digital signal). The AD conversion unit 202 outputs the input signal (digital signal) to the frequency conversion unit 203. In the following description, an input signal (digital signal) output from the AD conversion unit 202 is simply referred to as input signal.

The frequency conversion unit 203 is a processing unit that calculates an input spectrum of a frame based on an input signal. The processing of calculating the input spectrum of the frame by the frequency conversion unit 203 corresponds to the processing of the frequency conversion unit 120, and thus the description thereof will be omitted. The frequency conversion unit 203 outputs the information of the input spectrum to the noise estimation unit 204, the determination unit 205, the fundamental sound frequency estimation unit 206, the learning unit 207, and the detection unit 209.

The noise estimation unit 204 is a processing unit that estimates a noise spectrum N(l, k) included in the input spectrum. For example, the noise estimation unit 204 estimates a noise spectrum by using the technique described in Document 1 (S. F. Boll, "Suppression of acoustic noise in speech using spectral subtraction", IEEE Trans. Acoust., Speech, Signal Process., vol. 27, pp. 113-120, April 1979.). The noise estimation unit 204 outputs the information of the estimated noise spectrum to the determination unit 205.

The determination unit 205 is a processing unit that determines whether or not the frame is a speech-like frame based on the input spectrum of the frame and the noise spectrum. In the following description, a speech-like frame is expressed as a "speech frame". The determination unit 205 sequentially performs processing of calculating the difference sum between the input spectrum and the noise spectrum and processing of determining the likeness of the speech.

A process in which the determination unit 205 calculates a difference sum between the input spectrum and the noise spectrum will be described. The determination unit 205 calculates a difference sum S'(l) between the input spectrum and the noise spectrum based on Equation (9). In Equation (9), ML indicates a lower limit of the calculation band of the difference sum. MH indicates an upper limit of the calculation band of the difference sum. As illustrated in Equation (9), in a case where the difference between the input spectrum P(l, k) and the noise spectrum N(l, k) is a negative value, the determination unit 205 adds 0.

$$S'(l) = \sum_{k=ML}^{MH} \max(P(l, k) - N(l, k), 0) \qquad (9)$$

Processing for determining the likeness of speech by the determination unit 205 will be described. For example, the determination unit 205 determines whether or not the frame of a frame number "l" is a speech frame based on Equation (10).

$$L(l) = \begin{cases} 1 & S'(l) \geq TH3 \\ 0 & S'(l) < TH3 \end{cases} \qquad (10)$$

In a case where the difference sum S'(l) is equal to or larger than a threshold value TH3, the determination unit 205 determines that the frame of the frame number "l" is a speech frame and sets "1" to a determination result L(l). On the other hand, in a case where the difference sum S'(l) is less than the threshold value TH3, the determination unit 205 determines that the frame of the frame number "l" is not a speech frame and sets "0" to the determination result L(l). The determination unit 205 outputs the information of the determination result L(l) to the fundamental sound frequency estimation unit 206, the learning unit 207, and the detection unit 209.

In a case where the determination result L(l) acquired from the determination unit 205 is "1", the fundamental sound frequency estimation unit 206 is a processing unit that estimates a frequency of the fundamental sound based on the frame (speech frame) of the frame number "l". For example, the fundamental sound frequency estimation unit 206 calculates the frequency of the fundamental sound by using the gradation structure of the speech included in the speech frame. In the following description, the frequency of the fundamental sound of the speech frame calculated by the fundamental sound frequency estimation unit 206 is referred to a "fundamental sound frequency Fs0". The fundamental sound frequency corresponds to the frequency of the fundamental sound.

For example, the fundamental sound frequency estimation unit 206 calculates the fundamental sound frequency Fs0 from the speech frame based on Document 2 (SWIPE: A Sawtooth Waveform Inspired Pitch Estimator for Speech And Music,", University of Florida, 2007). The fundamental sound frequency estimation unit 206 outputs information on the fundamental sound frequency Fs0 to the learning unit 207 and the detection unit 209.

In a case where the determination result L(l) acquired from the determination unit 205 is "1", the learning unit 207 is a processing unit that learns a learning value based on the fundamental sound frequency Fs0 acquired from the fundamental sound frequency estimation unit 206. Here, it is assumed that a fundamental sound B'(l) corresponds to the fundamental sound frequency Fs0. In addition, it is assumed that the magnitude of B'(l) is an input spectrum value P(l, Fs0) as (B'(l)=P(l, Fs0).

When the determination result L(l)=1, the learning unit 207 learns the average value of B'(l) for each fundamental sound frequency.

The learning unit 207 calculates a learning value $B_a(l)$ based on Equation (11) in the case of "the fundamental sound frequency Fs0<50 Hz".

$$B_a(l) = (1-\alpha)*B_a(l-1) + \alpha*B'(l) \qquad (11)$$

The learning unit 207 calculates a learning value $B_b(l)$ based on Equation (12) in the case of "50 Hz≤the fundamental sound frequency Fs0<100 Hz".

$$B_b(l) = (1-\alpha)*B_b(l-1) + \alpha*B'(l) \qquad (12)$$

The learning unit 207 calculates a learning value $B_c(l)$ based on Equation (13) in the case of "100 Hz≤the fundamental sound frequency Fs0<150 Hz".

$$B_c(l) = (1-\alpha)*B_c(l-1) + \alpha*B'(l) \qquad (13)$$

Figure 11:
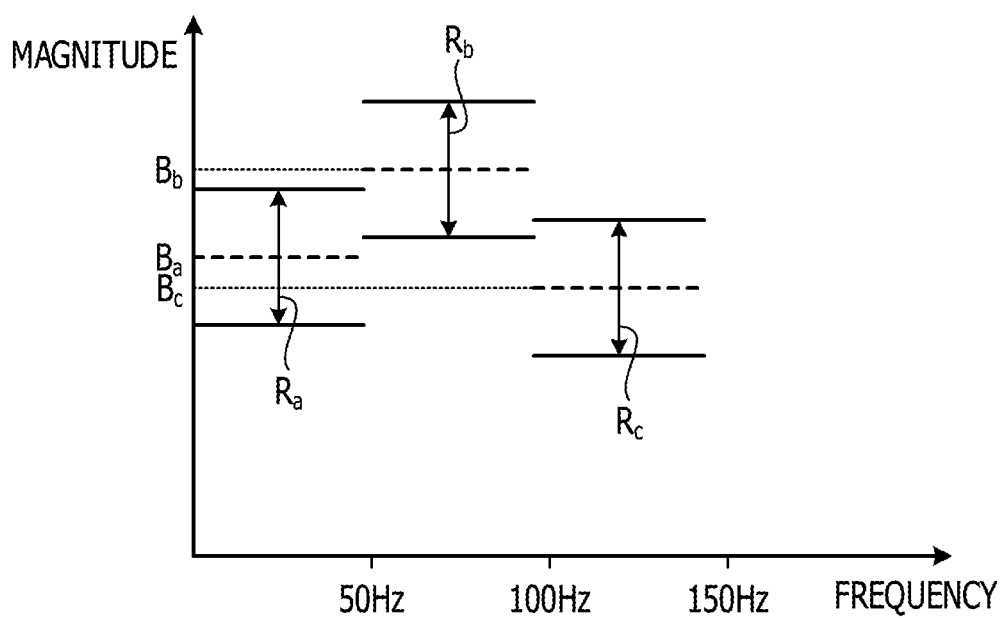
FIG. 11 is a diagram for complementarily describing a learning value learned for each fundamental sound frequency.

FIG. 11 is a diagram for complementarily describing a learning value learned for each fundamental sound frequency. The horizontal axis of FIG. 11 is the axis corresponding to the frequency, and the vertical axis is the axis corresponding to the magnitude of the learning value. As illustrated in FIG. 11, learning values $B_a$ to $B_c$ are set in each band. The learning unit 207 may set predetermined ranges $R_a$ to $R_c$ with the learning values $B_a$ to $B_c$ as references based on the variance.

Here, as an example, the case where the learning unit 207 calculates $B_c(l)$ from the learning value $B_a(l)$ at 50 Hz to 150 Hz has been described, but similarly, a learning value may be learned in the band of 150 Hz or more.

The learning unit 207 registers the information of the learning values $B_a$ to $B_c$ of each band in the learning value information 208a. In addition, the learning unit 207 may register the information of the predetermined ranges $R_a$ to $R_c$ corresponding to the learning values $B_a$ to $B_c$ in the learning value information 208a.

The following returns to the description of FIG. 10. The storage unit 208 has learning value information 208a. The storage unit 208 corresponds to a semiconductor memory element such as a RAM, a ROM, a flash memory, or a storage device such as an HDD.

The learning value information 208a holds information of the learning values $B_a$ to $B_c$ of each band calculated by the learning unit 207. In addition, the learning value information 208a may hold information of the predetermined ranges $R_a$ to $R_c$ corresponding to the respective learning values $B_a$, $B_b$, and $B_c$.

The detection unit 209 is a processing unit that detects a pitch frequency based on the fundamental sound frequency Fs0, the learning value information 208a, and the maximum value of the input spectrum. The detection unit 209 outputs the information on the detected pitch frequency to the registration unit 210.

For example, the detection unit 209 specifies a value having the maximum value among the plurality of local maximum values included in the input spectrum as the maximum value M. In addition, the detection unit 209 sets the frequency corresponding to the maximum value M to "F".

The detection unit 209 detects a pitch frequency (F0) based on Equation (14). For example, in a case where the determination result L(l) of the determination unit 205 is 1, the detection unit 209 detects the fundamental sound frequency Fs0 received from the fundamental sound frequency estimation unit 206 as a pitch frequency.

$$F0 = \begin{cases} Fs0 & L(l) = 1 \text{(when there is a fundamental tone frequency)} \\ F & \text{when } L(l) = 0 \text{ and } Bx(l)\text{-}THA \\ 0 & \text{other than that} \end{cases} \quad (14)$$

In a case where the determination result L(l) of the determination unit 205 is 0, the detection unit 209 determines whether or not the maximum value M is larger than "$B_X(l)$-THA". In a case where the determination result L(l)=0 and the maximum value M is larger than "$B_X(l)$-THA", the detection unit 209 detects the frequency "F" corresponding to the maximum value M as a pitch frequency. On the other hand, in a case where the determination result L(l)=0 but the maximum value M is not larger than "$B_X(l)$-THA", the detection unit 209 detects a pitch frequency as "0" (value indicating that there is no pitch frequency)".

Here, $B_X(l)$ varies depending on "F". For example, in a case where "F<50 Hz", $B_X(l)=B_a(l)$. In addition, when the maximum value M is larger than "$B_a(l)$-THA", it means that the maximum value M is included in $R_a$ illustrated in FIG. 11.

In the case of "50 Hz≤F<100 Hz", $B_X(l)=B_b(l)$. In addition, when the maximum value M is larger than "$B_b(l)$-THA", it means that the maximum value M is included in $R_b$ illustrated in FIG. 11.

In the case of "100 Hz≤F<150 Hz", $B_X(l)=B_c(l)$. In addition, when the maximum value M is larger than "$B_c(l)$-THA", it means that the maximum value M is included in $R_c$ illustrated in FIG. 11.

The registration unit 210 is a processing unit that registers the information on a pitch frequency in the DB 30b.

Figure 12:
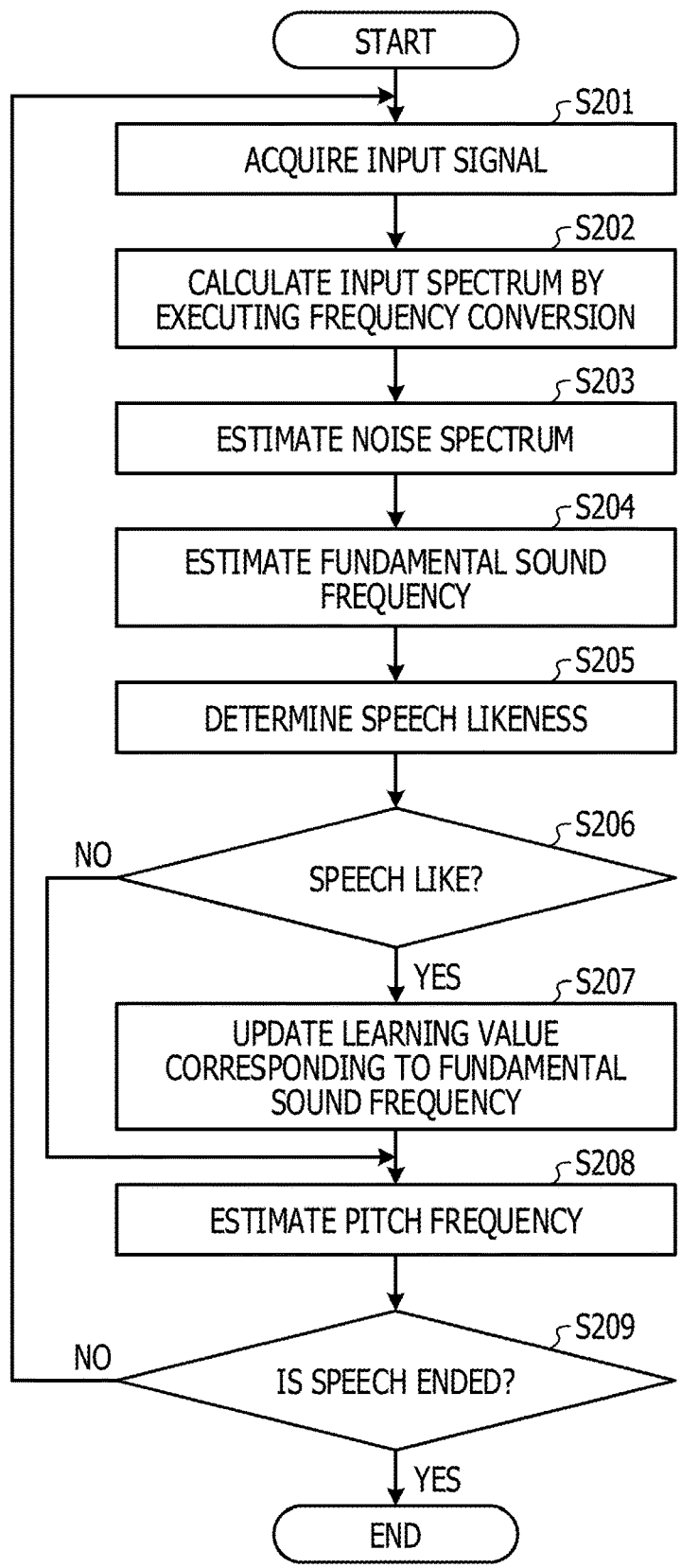
FIG. 12 is a flowchart illustrating a processing procedure of the speech processing apparatus according to Example 2.

Next, an example of the processing procedure of the speech processing apparatus 200 according to Example 2 will be described. FIG. 12 is a flowchart illustrating a processing procedure of the speech processing apparatus according to Example 2. As illustrated in FIG. 12, the acquisition unit 201 of the speech processing apparatus 200 acquires an input signal from the speech DB 30a (step S201).

The frequency conversion unit 203 of the speech processing apparatus 200 calculates an input spectrum by executing frequency conversion on a frame of an input signal (step S202). The noise estimation unit 204 of the speech processing apparatus 200 estimates a noise spectrum (step S203).

The fundamental sound frequency estimation unit 206 of the speech processing apparatus 200 estimates a fundamental sound frequency (step S204). The determination unit 205 of the speech processing apparatus 200 determines speech likeness (step S205). In a case where the speech processing apparatus 200 determines that the frame is a speech-like frame (step S206, Yes), the processing proceeds to step S207. On the other hand, in a case where the speech processing apparatus 200 does not determine that the frame is not a speech-like frame (step S206, No), the processing proceeds to step S208.

The learning unit 207 of the speech processing apparatus 200 updates the learning value of the fundamental sound corresponding to the fundamental sound frequency based on the frame determined to be speech-like (step S207). The detection unit 209 of the speech processing apparatus 200 estimates a pitch frequency based on the learning value of the fundamental sound (step S208).

In a case where the speech is not ended (step S209, No), the speech processing apparatus 200 proceeds to step S201. On the other hand, in a case where the speech is ended (step S209, Yes), the speech processing apparatus 200 ends the processing.

Next, the effect of the speech processing apparatus 200 according to Example 2 will be described. In the case of detecting a pitch frequency, the speech processing apparatus 200 detects the fundamental sound frequency Fs0 as a pitch frequency in a case where a frame to be detected is a speech frame. On the other hand, in a case where the frame to be detected is not a speech frame, the speech processing apparatus 200 detects a pitch frequency based on the learning value. In general, in a case where the target frame may be determined as a speech frame, there is a characteristic that the estimation result of the fundamental sound frequency estimation unit 206 is the most reliable. In addition, in a case where the target frame may not be determined as a speech frame, a pitch frequency is estimated by using the learning value. Therefore, it is possible to improve the accuracy of the pitch frequency estimation by switching the estimation processing depending on whether the target frame is a speech frame or not.

The speech processing apparatus 200 learns a learning value for each fundamental sound frequency to learn the learning value information 208a and compares the learning value information 208a with the frequency "F" of the frame to switch the learning value and estimate a pitch frequency. Therefore, it is possible to obtain a learning value for each band may be used, thereby improving the accuracy of the pitch frequency estimation.

EXAMPLE 3

Figure 13:
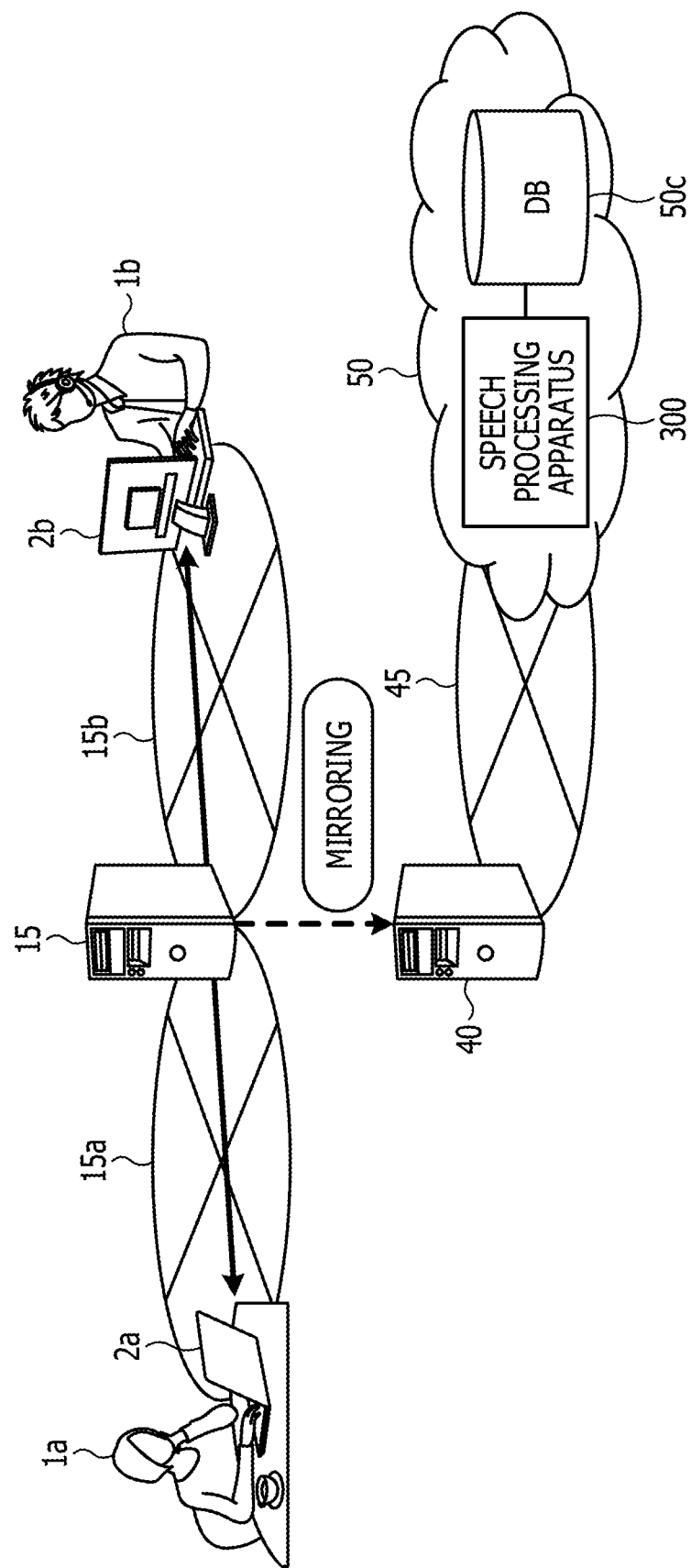
FIG. 13 is a diagram illustrating an example of a speech processing system according to Example 3.

FIG. 13 is a diagram illustrating an example of a speech processing system according to Example 3. As illustrated in FIG. 13, this speech processing system includes the terminal devices 2a and 2b, the GW 15, a recording server 40, and a cloud network 50. The terminal device 2a is connected to the GW 15 via the telephone network 15a. The terminal device 2b is connected to the GW 15 via the individual network 15b. The GW 15 is connected to the recording server 40. The recording server 40 is connected to the cloud network 50 via a maintenance network 45.

The cloud network 50 includes a speech processing apparatus 300 and a DB 50c. The speech processing apparatus 300 is connected to the DB 50c. The processing of the speech processing apparatus 300 may be executed by a plurality of servers (not illustrated) on the cloud network 50.

The terminal device 2a transmits a signal of the speech (or other than speech) of the speaker 1a collected by a microphone (not illustrated) to the GW 15. In the following description, a signal transmitted from the terminal device 2a is referred to as a first signal.

The terminal device 2b transmits a signal of the speech (or other than speech) of the speaker 1b collected by a microphone (not illustrated) to the GW 15. In the following description, a signal transmitted from the terminal device 2b is referred to as a second signal.

The GW 15 stores the first signal received from the terminal device 2a in the first buffer of the storage unit (not illustrated) of the GW 15 and transmits the first signal to the terminal device 2b. The GW 15 stores the second signal received from the terminal device 2b in the second buffer of the storage unit of the GW 15 and transmits the second signal to the terminal device 2a. In addition, the GW 15 performs mirroring with the recording server 40 and registers the information of the storage unit of the GW 15 in the storage unit of the recording server 40.

By performing mirroring with the GW 15, the recording server 40 registers the information of the first signal and the information of the second signal in the storage unit (the storage unit 42 to be described later) of the recording server 40. The recording server 40 calculates the input spectrum of the first signal by converting the frequency of the first signal and transmits information of the calculated input spectrum of the first signal to the speech processing apparatus 300. The recording server 40 calculates the input spectrum of the second signal by converting the frequency of the second signal and transmits information of the calculated input spectrum of the second signal to the speech processing apparatus 300.

The DB 50c stores an estimation result of the pitch frequency by the speech processing apparatus 300. For example, the DB 50c corresponds to a semiconductor memory element such as a RAM, a ROM, a flash memory, or a storage device such as an HDD.

The speech processing apparatus 300 estimates the pitch frequency of the speaker 1a based on the input spectrum of the first signal received from the recording server 40 and stores the estimation result in the DB 50c. The speech processing apparatus 300 estimates the pitch frequency of the speaker 1b based on the input spectrum of the second signal received from the recording server 40 and stores the estimation result in the DB 50c.

Figure 14:
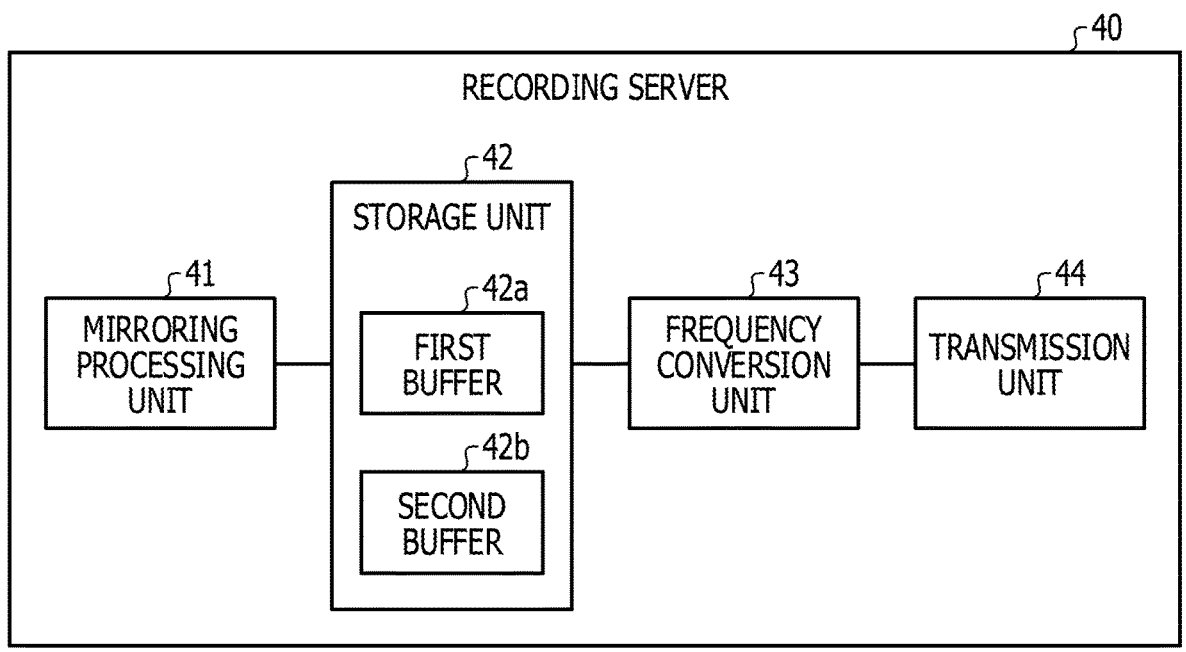
FIG. 14 is a functional block diagram illustrating a configuration of a recording server according to Example 3.

FIG. 14 is a functional block diagram illustrating a configuration of a recording server according to Example 3. As illustrated in FIG. 14, the recording server 40 includes a mirroring processing unit 41, a storage unit 42, a frequency conversion unit 43, and a transmission unit 44.

The mirroring processing unit 41 is a processing unit that performs mirroring by executing data communication with the GW 15. For example, the mirroring processing unit 41 acquires the information of the storage unit of the GW 15 from the GW 15 and registers and updates the acquired information in the storage unit 42.

The storage unit 42 includes a first buffer 42a and a second buffer 42b. The storage unit 42 corresponds to a semiconductor memory element such as a RAM, a ROM, a flash memory, or a storage device such as an HDD.

The first buffer 42a is a buffer that holds the information of the first signal. The second buffer 42b is a buffer that holds the information of the second signal. It is assumed that the first signal stored in the first buffer 41a and the second signal stored in the second buffer 41b are AD-converted signals.

The frequency conversion unit 43 acquires the first signal from the first buffer 42a and calculates the input spectrum of the frame based on the first signal. In addition, the frequency conversion unit 43 acquires the second signal from the second buffer 42b and calculates the input spectrum of the frame based on the second signal. In the following description, the first signal or the second signal will be denoted as "input signal" unless otherwise distinguished. The processing of calculating the input spectrum of the frame of the input signal by the frequency conversion unit 43 corresponds to the processing of the frequency conversion unit 120, and thus the description thereof will be omitted. The frequency conversion unit 43 outputs the information on the input spectrum of the input signal to the transmission unit 44.

The transmission unit 44 transmits the information on the input spectrum of the input signal to the speech processing apparatus 300 via the maintenance network 45.

Figure 15:
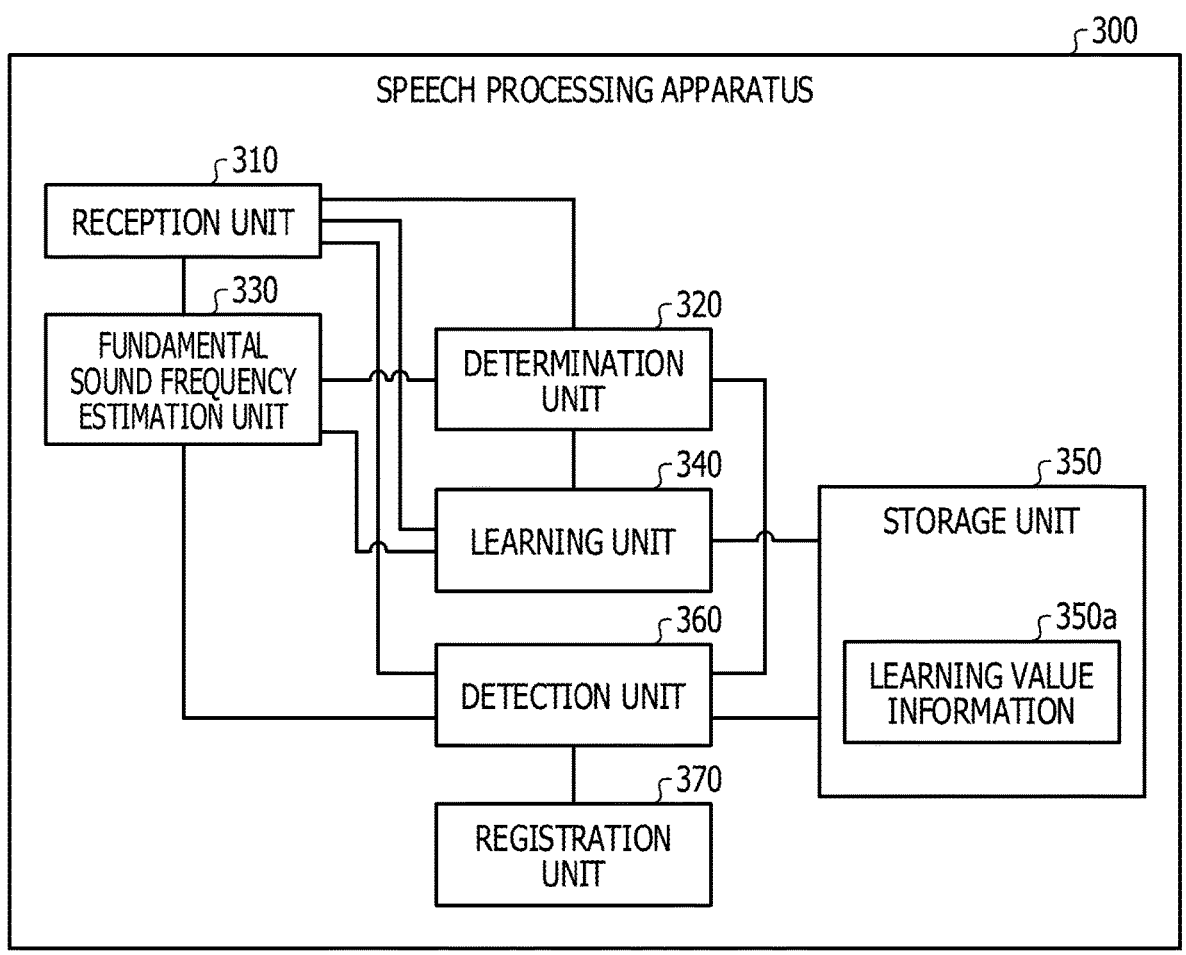
FIG. 15 is a functional block diagram illustrating a configuration of a speech processing apparatus according to Example 3.

Subsequently, the configuration of the speech processing apparatus 300 described with reference to FIG. 13 will be described. FIG. 15 is a functional block diagram illustrating the configuration of the speech processing apparatus according to Example 3. As illustrated in FIG. 15, the speech processing apparatus 300 includes a reception unit 310, a determination unit 320, a fundamental sound frequency estimation unit 330, a learning unit 340, a storage unit 350, a detection unit 360, and a registration unit 370.

The reception unit 310 is a processing unit that receives information on an input spectrum of an input signal from the transmission unit 44 of the recording server 40. The reception unit 310 outputs the information of the input spectrum to the determination unit 320, the fundamental sound frequency estimation unit 330, the learning unit 340, and the detection unit 360.

The determination unit 320 is a processing unit that determines a speech-like frame from a plurality of frames based on the characteristics of the input spectrum of the frames. In the following, a frame that is likely to be a speech is expressed as a "speech frame". The determination unit 320 outputs the determination result to the fundamental sound frequency estimation unit 330, the learning unit 340, and the detection unit 360. The determination unit 320 sequentially performs processing of calculating an autocorrelation, processing of calculating a sum of autocorrelations, and processing of determining speech likeness.

A process in which the determination unit 320 calculates autocorrelation will be described. The determination unit 320 calculates an autocorrelation R(I, t) between the input spectrum and a spectrum obtained by shifting the input spectrum by "t" in the frequency direction based on Equation (15). In Expression (15), t represents a shift width of the autocorrelation.

$$R(l, t) = \sum_{k=0}^{N-1} P(l, k) * P(l, k + t) \qquad (15)$$

A process in which the determination unit 320 calculates the sum of the autocorrelation will be described. The determination unit 320 calculates a sum S"(l) of the autocorrelation based on Equation (16). In Equation (16), "T" indicates the condition of the shift width of the autocorrelation.

$$S''(l) = \sum_{t=0}^{T-1} R(l, t) \qquad (16)$$

Processing for determining speech likeness by the determination unit 320 will be described. For example, the determination unit 320 determines whether or not the frame of a frame number "l" is a speech frame based on Equation (17).

$$L(l) = \begin{cases} 1 & S''(l) \geq TH4 \\ 0 & S''(l) < TH4 \end{cases} \qquad (17)$$

In a case where the sum S"(l) of the autocorrelation is equal to or larger than a threshold value TH4, the determination unit 320 determines that the frame of the frame number "l" is a speech frame and sets "1" to a determination result L(l). On the other hand, in a case where the sum S"(l) of the autocorrelation is less than the threshold value TH4, the determination unit 320 determines that the frame of the frame number "l" is not a speech frame and sets "0" to the determination result L(l). The determination unit 320 outputs the information of the determination result L(l) to the fundamental sound frequency estimation unit 330, the learning unit 340, and the detection unit 360.

In a case where the determination result L(l) acquired from the determination unit 320 is "1", the fundamental sound frequency estimation unit 330 is a processing unit that estimates a frequency of the fundamental sound based on the frame (speech frame) of the frame number "l". For example, the fundamental sound frequency estimation unit 330 estimates a frequency of the fundamental sound based on Document 2. In the following description, the frequency of the fundamental sound calculated by the fundamental sound frequency estimating unit 330 is expressed as "fundamental sound frequency Fs0". The fundamental sound frequency estimation unit 330 outputs information on the fundamental sound frequency Fs0 to the learning unit 340 and the detection unit 360.

The learning unit 340 is a processing unit that learns a learning value based on the fundamental sound frequency Fs0 and the input spectrum in a case where the determination result L(l) acquired from the determination unit 320 is "1". The learning unit 340 registers and updates the learning result as learning value information 350a in the storage unit 350. An example of the processing of the learning unit 340 will be described below.

The learning unit 340 searches for the maximum value M of the input spectrum. The processing of searching for the maximum value M of the input spectrum by the learning unit 340 is similar to the processing of searching for the maximum value M of the input spectrum by the learning unit 140. The frequency corresponding to the maximum value M of the input spectrum is set to "F".

In an initial interval, the learning unit 340 calculates a magnitude B"(l) of the fundamental sound of the input spectrum based on Equation (18). The initial interval is an interval from the time when the reception of the input signal is started to the end of a predetermined time.

$$B''(l) = \begin{cases} P(1, Fs0) & \text{when } M - p(1, Fs0) < THB \\ \max_{i=1,2,\ldots} (P(1, i * Fs0)) & \text{when } M - P(1, Fs0) \geq THB \end{cases} \qquad (18)$$

As illustrated in Equation (18), the learning unit 340 sets the value of B"(l) as P(l, Fs0) in a case where the value of "M-P(l, Fs0)" is smaller than a threshold value THB. P(l, Fs0) indicates the magnitude of the fundamental sound frequency Fs0 in the input spectrum of the frame number "l". On the other hand, in a case where the value of "M-P(l, Fs0)" is equal to or larger than the threshold value THB, the learning unit 340 sets the value of B"(l) as max{P(l, i×Fs0)}, (i=1, 2, . . . ).

Figure 16:
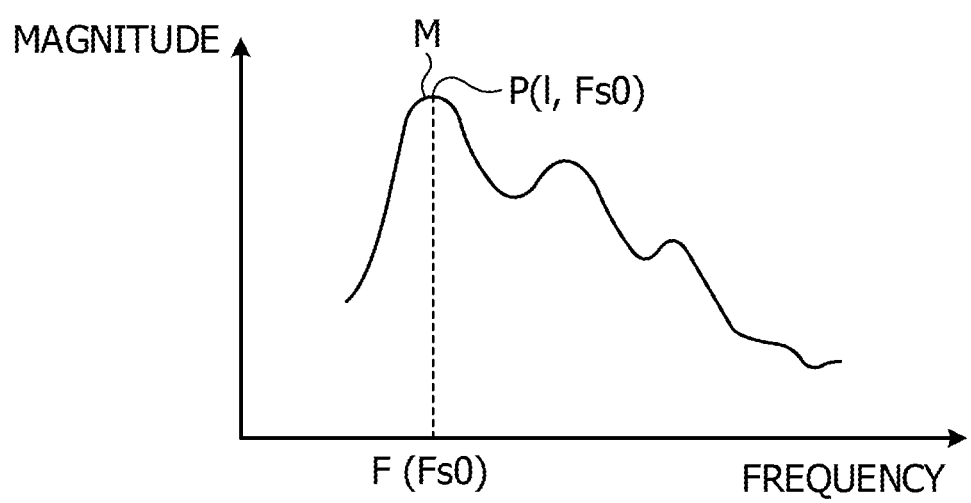
FIG. 16 is a diagram (1) for complementarily describing processing of a learning unit according to Example 3.
Figure 17:
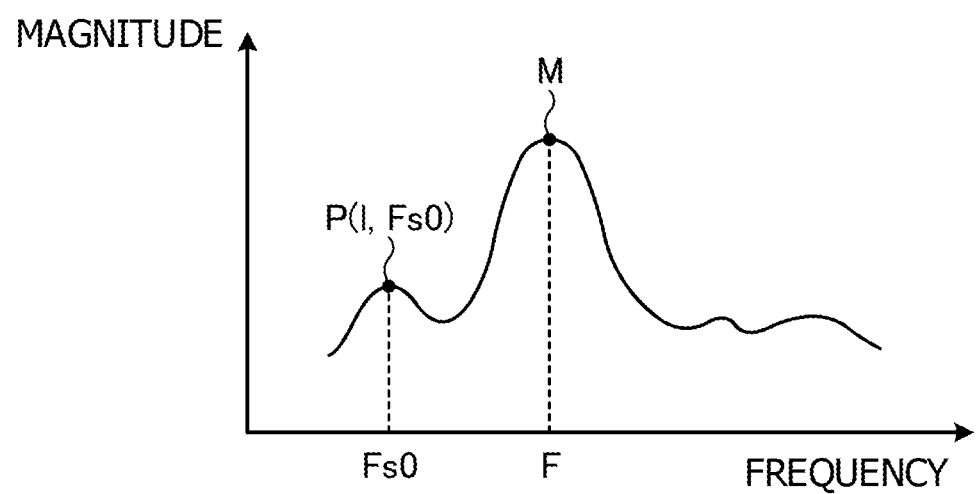
FIG. 17 is a diagram (2) for complementarily describing processing of the learning unit according to Example 3.

FIGS. 16 and 17 are diagrams for complementarily describing processing of the learning unit according to Example 3. As illustrated in FIG. 16, when the value of "M-P(l, Fs0)" is smaller than the threshold value THB, it means that the fundamental sound frequency Fs0 and the frequency F are substantially the same. For this reason, the learning unit 340 sets the value of B"(l) as P(l, Fs0) in a case where the value of "M-P(l, Fs0)"is smaller than the threshold value THB.

As illustrated in FIG. 17, when the value of "M-P(l, Fs0)" is equal to or larger than the threshold value THB, it means that there is another local maximum value other than the value corresponding to the fundamental sound frequency Fs0. In this case, the learning unit 340 learns the maximum value of the harmonic sound among the plurality of values of the harmonic sounds as a learning value. For example, in a case where P(l, 2×Fs0) is the maximum among P(l, 1×Fs0), P(l, 2×Fs0), P(l, 3×Fs0), . . . , the learning unit 340 learns P(l, 2×Fs0) of the double harmonic sound as a learning value. For the P(l, i×Fs0), (i=1, 2, . . . ), the learning unit 340 specifies i in a case where the value of P(l, i×Fs0) is the maximum, as a fundamental sound multiplier v. In a case where P (l, 2×Fs0) is the maximum, the fundamental sound multiplier v=2.

The learning unit 340 calculates the magnitude B"(l) of the fundamental sound based on Equation (19), except for the initial interval.

$$B''(l) = P(1, v*Fs0) \qquad (19)$$

Furthermore, when the determination result L(l)=1, the learning unit 340 learns a learning value (average value of B"(l)) for each fundamental sound frequency.

The learning unit 340 calculates the learning value $B_a(l)$ based on Equation (11) in the case of "the fundamental sound frequency Fs0<50 Hz". (However, B'(l) in Equation (11) is replaced with B"(l).)

The learning unit 340 calculates a learning value $B_b(l)$ based on Equation (12) in the case of "50 Hz≤the fundamental sound frequency Fs0<100 Hz". (However, B'(l) in Equation (12) is replaced with B"(l).)

The learning unit 340 calculates a learning value $B_c(l)$ based on Equation (13) in the case of "100 Hz≤the fundamental sound frequency Fs0<150 Hz". (However, B'(l) in Equation (13) is replaced with B"(l).)

The following returns to the description of FIG. 15. The storage unit 350 has the learning value information 350a. The storage unit 350 corresponds to a semiconductor memory element such as a RAM, a ROM, a flash memory, or a storage device such as an HDD.

The learning value information 350a holds the information of the fundamental sound multiplier v and the learning values $B_a$, $B_b$, and $B_c$ of each band. In addition, the learning value information 350a may hold information of the predetermined ranges $R_a$ to $R_c$ corresponding to the respective learning values $B_a$ to $B_c$.

The detection unit 360 is a processing unit that detects a pitch frequency based on the fundamental sound frequency Fs0, the learning value information 350a, and the maximum value M of the input spectrum. The detection unit 360 outputs the information on the detected pitch frequency to the registration unit 370.

For example, the detection unit 360 specifies the maximum value M having the maximum value among the plurality of local maximum values included in the input spectrum. In addition, the detection unit 360 sets the frequency corresponding to the maximum value M to "F".

The detection unit 360 detects a pitch frequency (F0) based on Equation (20). For example, in a case where the determination result L(l) of the determination unit 320 is 1, the detection unit 360 detects the fundamental sound frequency Fs0 received from the fundamental sound frequency estimation unit 330 as a pitch frequency.

$$F0 = \begin{cases} Fs0 & \text{when there is a fundamental tone frequency} \\ F/v & \text{when } L(1) = 0 \text{ and } M > Bx(1)\text{-}THB \\ 0 & \text{other than that} \end{cases} \quad (20)$$

In a case where the determination result L(l) of the determination unit 320 is 0, the detection unit 360 determines whether or not the maximum value M is larger than "$B_X(l)$-THB". In a case where the determination result L(l)=0 and the maximum value M is larger than "$B_X(l)$-THB", the detection unit 360 detects a value obtained by dividing the frequency "F" corresponding to the maximum value M by the fundamental sound multiplier "v" as a pitch frequency. On the other hand, in a case where the determination result L(l)=0 but the maximum value M is not larger than "$B_X(l)$-THA", the detection unit 360 detects a pitch frequency as "0" (value indicating that there is no pitch frequency)".

Here, $B_X(l)$ varies depending on "F". The description related to $B_X(l)$ is the same as that described in Example 2.

The registration unit 370 is a processing unit that registers the information on a pitch frequency in the DB 50c.

Figure 18:
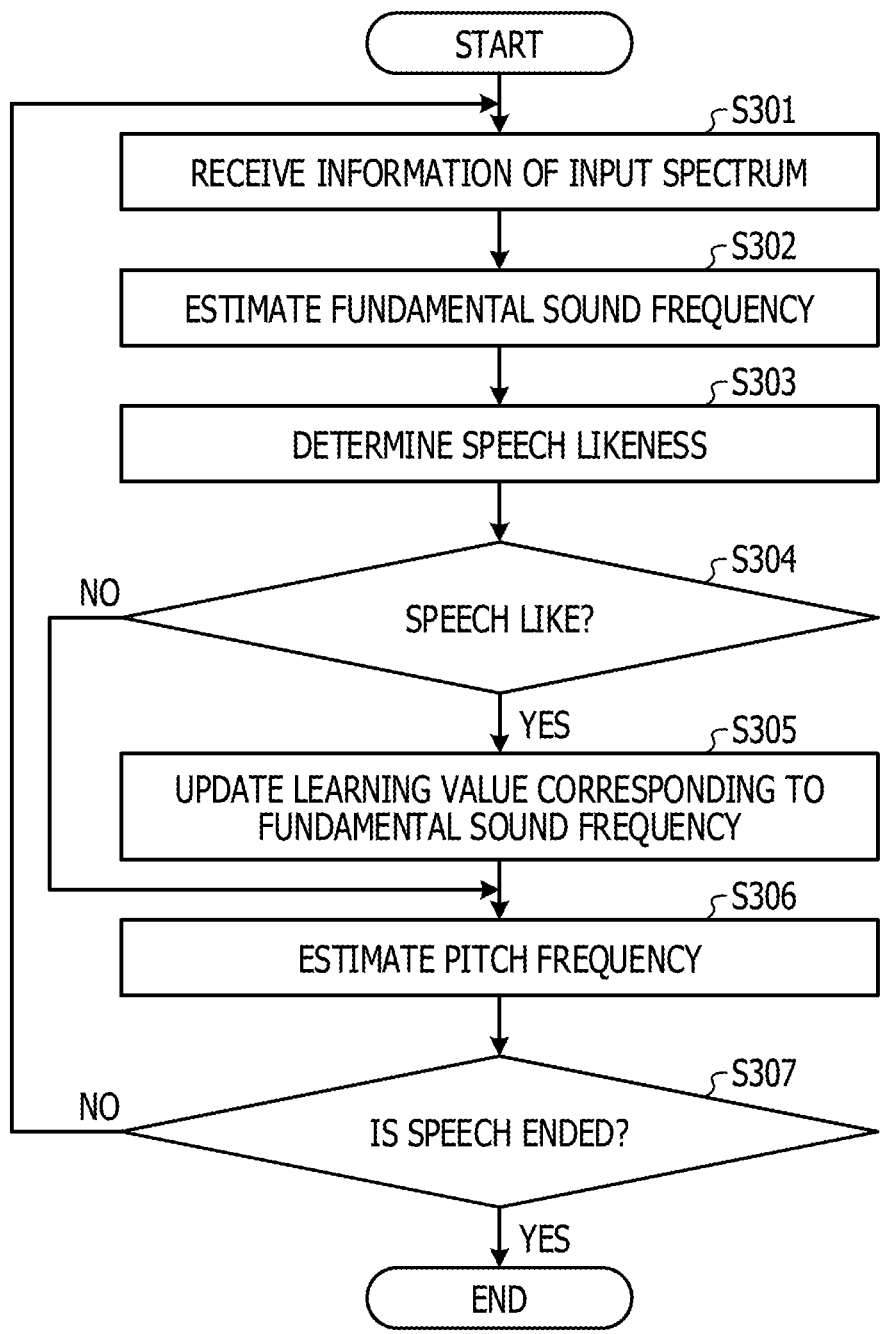
FIG. 18 is a flowchart illustrating a processing procedure of the speech processing apparatus according to Example 3.

Next, an example of the processing procedure of the speech processing apparatus 300 according to Example 3 will be described. FIG. 18 is a flowchart illustrating a processing procedure of the speech processing apparatus according to Example 3. As illustrated in FIG. 18, the reception unit 310 of the speech processing apparatus 300 receives the input spectrum information from the recording server 40 (step S301).

The fundamental sound frequency estimation unit 330 of the speech processing apparatus 300 estimates a fundamental sound frequency (step S302). The determination unit 320 of the speech processing apparatus 300 determines speech likeness (step S303). In a case where the speech processing apparatus 300 determines that the frame is a speech-like frame (step S304, Yes), the processing proceeds to step S305. On the other hand, in a case where the speech processing apparatus 300 does not determine that the frame is not a speech-like frame (step S304, No), the processing proceeds to step S306.

The learning unit 340 of the speech processing apparatus 300 updates the learning value of the fundamental sound corresponding to the fundamental sound frequency based on the frame determined to be speech-like (step S305). The detection unit 360 of the speech processing apparatus 300 estimates a pitch frequency based on the learning value of the fundamental sound (step S306).

In a case where the speech is not ended (step S307, No), the speech processing apparatus 300 proceeds to step S301. On the other hand, in a case where the speech is ended (step S307, Yes), the speech processing apparatus 300 ends the processing.

Next, the effect of the speech processing apparatus 300 according to Example 3 will be described. The speech processing apparatus 300 performs the following processing in a case where the difference between the maximum value M of the input spectrum of the speech frame and the magnitude of the input spectrum corresponding to the fundamental sound frequency is equal to or larger than a threshold value. The speech processing apparatus 300 learns an average value or variance of the input spectra closest to the maximum value among the input spectra corresponding to integral multiples of the fundamental sound frequency as a learning value. In addition, the speech processing apparatus 300 stores the learning value in association with a multiple (fundamental sound multiplier v) of the frequency of the learning value with respect to the fundamental sound frequency. As a result, a value corresponding to a frequency at which the local maximum value is the largest may be learned as a learning value. In addition, by storing the learning value together with the fundamental sound multiplier v, even if the learning value is a harmonic sound, it is possible to estimate a frequency of the fundamental sound based on the harmonic sound and the fundamental sound multiplier v.

In Example 3, as an example, the case where the recording server 40 calculates the input spectrum of the input signal has been described, but similar to Examples 1 and 2, the speech processing apparatus 300 may calculate the input spectrum of the input signal.

Figure 19:
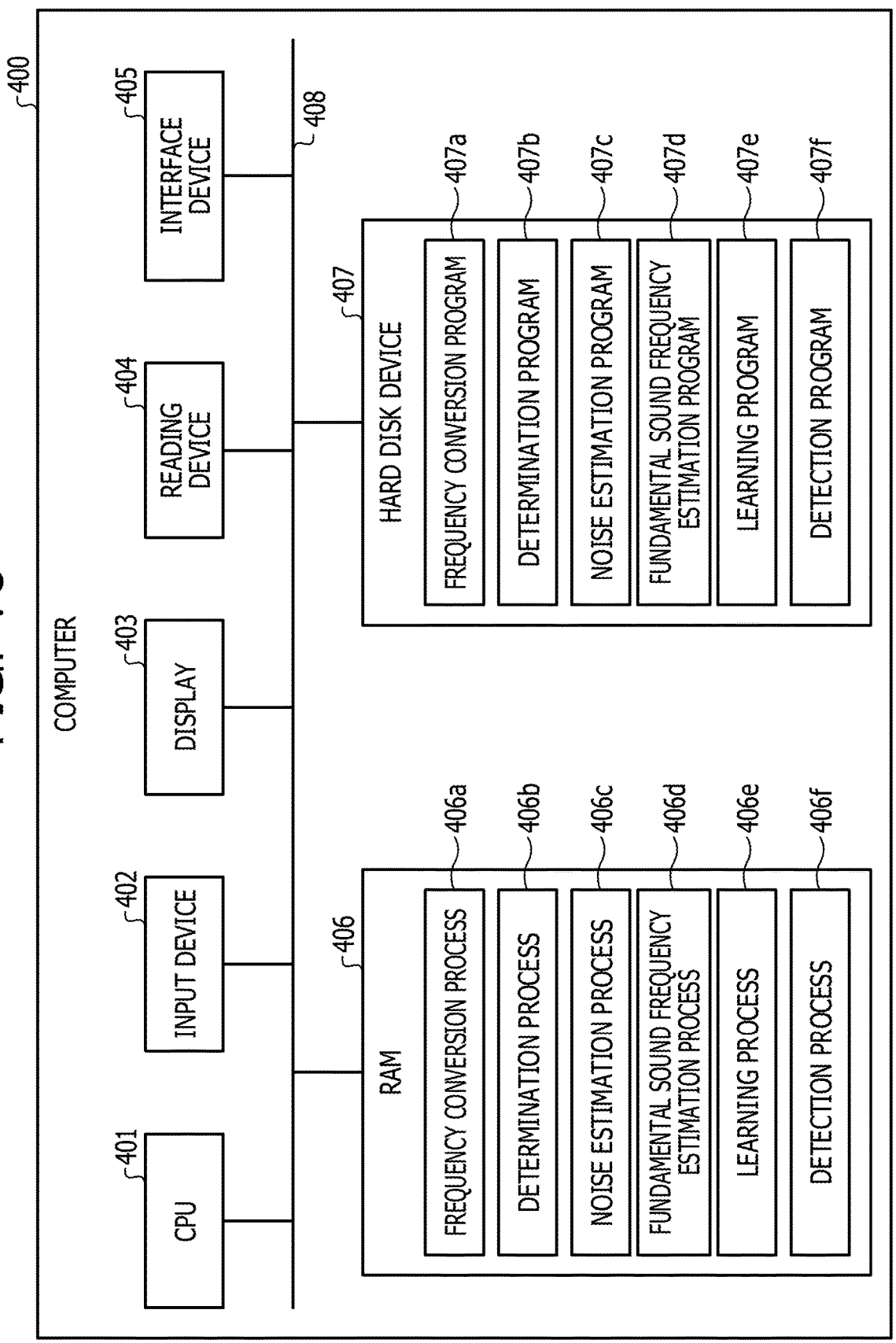
FIG. 19 is a diagram illustrating an example of a hardware configuration of a computer that realizes a function similar to that of the speech processing apparatus.
Figure 20:
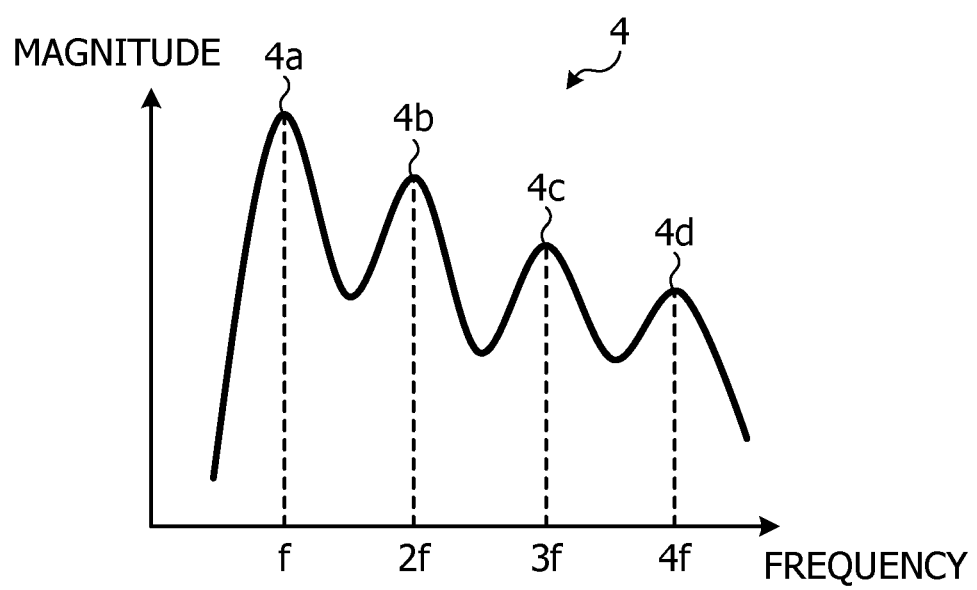
FIG. 20 is a diagram for describing terms related to an input spectrum.
Figure 21:
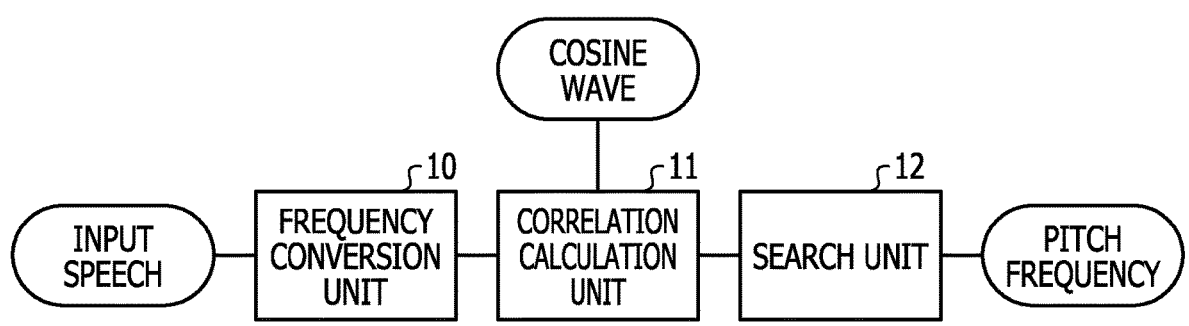
FIG. 21 is a diagram (1) for describing Related Art 1.
Figure 22:
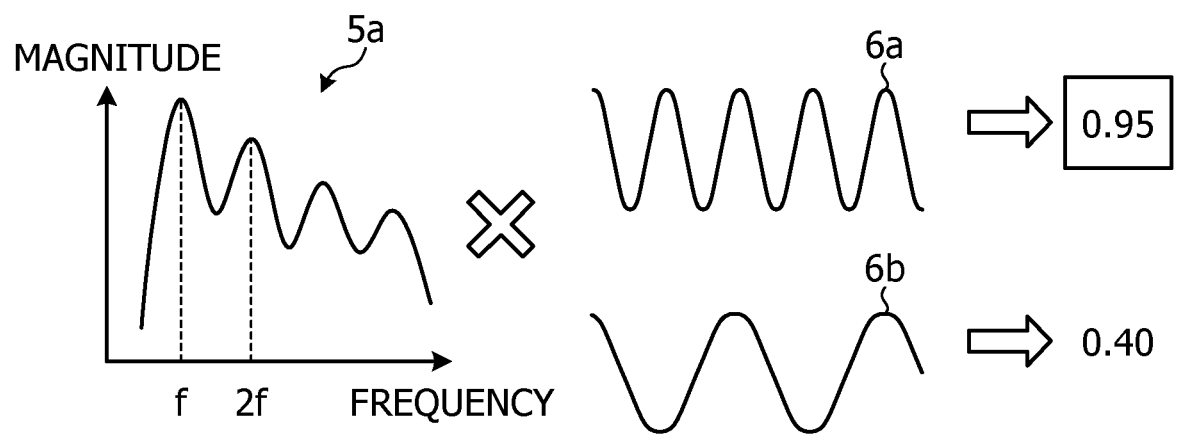
FIG. 22 is a diagram (2) for describing Related Art 1.

Next, an example of a hardware configuration of a computer that realizes the same functions as those of the speech processing apparatuses 100, 200, and 300 illustrated in the above examples will be described. FIG. 19 is a diagram illustrating an example of a hardware configuration of the computer that realizes a function similar to that of the speech processing apparatus.

As illustrated in FIG. 19, a computer 400 includes a CPU 401 that executes various arithmetic processing, an input device 402 that accepts input of data from the user, and a display 403. In addition, the computer 400 includes a reading device 404 that reads a program or the like from a storage medium and an interface device 405 that exchanges data with a recording device or the like via a wired or wireless network. In addition, the computer 400 includes a RAM 406 for temporarily storing various kinds of information and a hard disk device 407. Then, each of the devices 401 to 407 is connected to a bus 408.

The hard disk device 407 has a frequency conversion program 407a, a determination program 407b, a noise estimation program 407c, a fundamental frequency estimation program 407d, a learning program 407e, and a detection program 407f. The CPU 401 reads out the programs 407a to 407f and develops the programs in the RAM 406.

The frequency conversion program 407a functions as a frequency conversion process 406a. The determination program 407b functions as a determination process 406b. The noise estimation program 407c functions as a noise estimation process 406c. The fundamental frequency estimation program 407d functions as a fundamental frequency estimation process 406d. The learning program 407e functions as a learning process 406e. The detection program 407f functions as a detection process 406f.

The processing of the frequency conversion process 406a corresponds to the processing of the frequency conversion units 120 and 203. The processing of the determination process 406b corresponds to the processing of the determination units 130, 205, and 320. The processing of the noise estimation process 406c corresponds to the processing of the noise estimation unit 204. The processing of the fundamental sound frequency estimation process 406d corresponds to the processing of the fundamental sound frequency estimation units 206 and 330. The processing of the learning process 406e corresponds to the processing of the learning units 140, 207, and 340. The processing of the detection process 406f corresponds to the processing of the detection units 160, 209, and 360.

The programs 407a to 407f do not necessarily have to be stored in the hard disk device 407 from the beginning. For example, the program is stored in a "portable physical medium" such as a flexible disk (FD), a CD-ROM, a DVD disk, a magneto-optical disk, an IC card inserted into the computer 400. Then, a computer 600 may read and execute the programs 407a to 407f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A speech processing method for estimating a pitch frequency, the method comprising:
executing a conversion process that includes calculating, for each of a plurality of frames included in an input signal, a spectrum of a respective frame by using signal components included in the respective frame;
executing a determination process that includes determining a speech-like frame from among the plurality of frames by using characteristics derived from the spectrum of the respective frame;
executing a learning process in response to a plurality of determination results of the speech-like-frame, the learning process including
specifying, for each determination result of the speech-like-frame, a fundamental sound by using a plurality of local maximum values included in the spectrum of the respective frame determined as the speech-like-frame, and
obtaining a learned value by performing learning processing on a magnitude of the fundamental sound specified from each determination result of the speech-like-frame, the learned value including an average value and a variance of the magnitude of the fundamental sound specified from each determination result of the speech-like-frame; and
executing a detection process by using the learned value, the detection process including
detecting a pitch frequency of the respective frame determined as the speech-like-frame by using a lower threshold and an upper threshold, the lower threshold being obtained by subtracting the variance included in the learned value from the average value included in the learned value, the upper threshold being obtained by adding the variance included in the learned value to the average value included in the learned value.

2. The speech processing method according to claim 1, wherein the determination process is configured to calculate a spectrum envelope of the spectrum by smoothing the spectrum of the respective frame in a frequency direction and determine whether the respective frame is the speech-like-frame by using a difference between the spectrum and the spectrum envelope.

3. The speech processing method according to claim 1, the method further comprising:
executing an estimation process that includes estimating a noise spectrum based on the spectrum,
wherein the determination process is configured to determine the speech-like-frame based on a difference between the spectrum of the respective frame and the noise spectrum.

4. The speech processing method according to claim 1, wherein the determination process is configured to determine the speech-like-frame based on an autocorrelation of the spectrum of the respective frame.

5. The speech processing method according to claim 1, wherein the learning process is configured to:
search for a largest local maximum value among a plurality of local maximum values included in a predetermined band of the spectrum of the speech-like-frame; and
learn the learning value based on a local maximum value of which the magnitude compared with the largest local maximum value is included within a certain range and is on a lowest frequency side among the plurality of local maximum values.

6. The speech processing method according to claim 1, wherein, in a case where a difference between a local maximum value of the spectrum of the respective frame and the learning value is within a predetermined range, the detection process is configured to detect a frequency corresponding to the local maximum value as a pitch frequency of the respective frame.

7. The speech processing method according to claim 1, the method further comprising:
executing an estimation process that includes estimating a frequency of the fundamental sound from the speech-like-frame,
wherein the learning process is configured to learn the learning value for each frequency of the fundamental sound.

8. The speech processing method according to claim 7, wherein the detection process is configured to
output the frequency of the fundamental sound as the pitch frequency in a case where a frame to be detected for the pitch frequency is the speech-like-frame, and
detect the pitch frequency based on the learning value in a case where a frame to be detected for the pitch frequency is not the speech-like-frame.

9. The speech processing method according to claim 1, the method further comprising:
executing an estimation process that includes estimating a frequency of the fundamental sound from the speech-like-frame,
wherein the learning process is configured to
learn an average value or variance of a power of a spectra closest to a maximum value as the learning value among a spectra corresponding to integral multiples of the frequency of the fundamental sound, in a case where a difference between the maximum value of the spectrum of the speech-like-frame and a magnitude of a spectra corresponding to the frequency of the fundamental sound is not less than a threshold value, and
store the learning value in association with a multiple of the frequency of the learning value with respect to the frequency of the fundamental sound.

10. The speech processing method according to claim 9, wherein the detection process is configured to detect the pitch frequency by dividing a frequency of a local maximum value by the multiple in a case where a local maximum value of a frame to be detected for the pitch frequency is included within a range based on the learning value.

11. A speech processing apparatus comprising:
a memory; and
a processor coupled to the memory and configured to:
execute a conversion process that includes calculating, for each of a plurality of frames included in an input signal, a spectrum of a respective frame by using signal components included in the respective frame;
execute a determination process that includes determining a speech-like frame from among the plurality of frames by using characteristics derived from the spectrum of the respective frame, execute a learning process in response to a plurality of determination results of the speech-like-frame, the learning process including
specifying, for each determination result of the speech-like-frame, a fundamental sound by using a plurality of local maximum values included in the spectrum of the respective frame determined as the speech-like-frame, and
obtaining a learned value by performing learning processing on a magnitude of the fundamental sound specified from each determination result of the speech-like-frame, the learned value including an average value and a variance of the magnitude of the fundamental sound specified from each determination result of the speech-like-frame, and
execute a detection process by using the learned value, the detection process including
detecting a pitch frequency of the respective frame determined as the speech-like-frame by using a lower threshold and an upper threshold, the lower threshold being obtained by subtracting the variance included in the learned value from the average value included in the learned value, the upper threshold being obtained by adding the variance included in the learned value to the average value included in the learned value.

12. A non-transitory computer-readable storage medium for storing a speech processing computer program that causes a processor to execute processing, the processing comprising:
executing a conversion process that includes calculating, for each of a plurality of frames included in an input signal, a spectrum of a respective frame by using signal components included in the respective frame;
executing a determination process that includes determining a speech-like frame from among the plurality of frames by using characteristics derived from the spectrum of the respective frame;
executing a learning process in response to a plurality of determination results of the speech-like-frame, the learning process including
specifying, for each determination result of the speech-like-frame, a fundamental sound by using a plurality of local maximum values included in the spectrum of the respective frame determined as the speech-like-frame, and
obtaining a learned value by performing learning processing on a magnitude of the fundamental sound specified from each determination result of the speech-like-frame, the learned value including an average value and a variance of the magnitude of the fundamental sound specified from each determination result of the speech-like-frame; and
executing a detection process by using the learned value, the detection process including
detecting a pitch frequency of the respective frame determined as the speech-like-frame by using a lower threshold and an upper threshold, the lower threshold being obtained by subtracting the variance included in the learned value from the average value included in the learned value, the upper threshold being obtained by adding the variance included in the learned value to the average value included in the learned value.

* * * * *